US009891658B2

(12) United States Patent
Michael

(10) Patent No.: US 9,891,658 B2
(45) Date of Patent: Feb. 13, 2018

(54) MEDICAL SUPPLY CABINET WITH LIGHTING FEATURES

(71) Applicant: ARxIUM, Inc., Buffalo Grove, IL (US)

(72) Inventor: James A. Michael, Cranberry Township, PA (US)

(73) Assignee: ARxIUM, Inc., Buffalo Grove, IL (US)

( * ) Notice: Subject to any disclaimer, the term of this patent is extended or adjusted under 35 U.S.C. 154(b) by 37 days.

(21) Appl. No.: 15/042,418

(22) Filed: Feb. 12, 2016

(65) Prior Publication Data
US 2016/0161984 A1 Jun. 9, 2016

Related U.S. Application Data

(63) Continuation of application No. 14/257,785, filed on Apr. 21, 2014, now Pat. No. 9,291,341, which is a continuation of application No. 13/015,349, filed on Jan. 27, 2011, now Pat. No. 8,746,908.

(60) Provisional application No. 61/336,809, filed on Jan. 27, 2010.

(51) Int. Cl.
| G06F 1/16 | (2006.01) |
| H05K 5/00 | (2006.01) |
| H05K 7/00 | (2006.01) |
| F21V 33/00 | (2006.01) |
| G07F 11/62 | (2006.01) |
| F21V 23/00 | (2015.01) |
| G08B 5/36 | (2006.01) |
| A47B 81/00 | (2006.01) |
| B41J 2/525 | (2006.01) |
| F21W 131/301 | (2006.01) |
| F21Y 101/00 | (2016.01) |
| F21Y 115/10 | (2016.01) |

(52) U.S. Cl.
CPC ............. *G06F 1/16* (2013.01); *A47B 81/00* (2013.01); *B41J 2/525* (2013.01); *F21V 23/003* (2013.01); *F21V 23/006* (2013.01); *F21V 33/0012* (2013.01); *G07F 11/62* (2013.01); *G08B 5/36* (2013.01); *F21W 2131/301* (2013.01); *F21Y 2101/00* (2013.01); *F21Y 2115/10* (2016.08)

(58) Field of Classification Search
CPC .......... G06F 1/20; G06F 1/206; G06F 1/1677; G06F 1/16; H05K 7/14; H05K 5/0004; H05K 5/02
USPC ............... 361/679.53, 724–727; 165/104.33; 62/259.2
See application file for complete search history.

(56) References Cited

U.S. PATENT DOCUMENTS

| 3,682,113 A | 8/1972 | McClellan et al. |
| 4,267,942 A | 5/1981 | Wick, Jr. et al. |
| 4,785,969 A | 11/1988 | McLaughlin |
| 4,865,404 A | 9/1989 | Harper |

(Continued)

FOREIGN PATENT DOCUMENTS

| JP | 2001-275766 | 10/2001 |
| KR | 10/0963597 | 6/2010 |
| WO | WO 2010-080660 | 7/2010 |

*Primary Examiner* — Anthony Haughton
(74) *Attorney, Agent, or Firm* — Reinhart Boerner Van Deuren s.c.

(57) ABSTRACT

A medical supply cabinet having improved features for user access, user control, and illumination is provided. The supply cabinet is provided with a selectively controllable illumination source, such as light-emitting diodes, that provide the operator with visual information regarding access to individual compartments of the supply cabinet.

20 Claims, 36 Drawing Sheets

(56) References Cited

U.S. PATENT DOCUMENTS

| | | |
|---|---|---|
| 4,927,051 A | 5/1990 | Falk et al. |
| 4,941,570 A | 7/1990 | Kruger et al. |
| 5,014,875 A | 5/1991 | McLaughlin et al. |
| 5,046,455 A | 9/1991 | Christiansen et al. |
| 5,087,107 A | 2/1992 | Fumanelli |
| 5,222,789 A | 6/1993 | Yoshikawa |
| 5,246,136 A | 9/1993 | Loidl |
| 5,255,971 A | 10/1993 | Aisley |
| 5,259,668 A | 11/1993 | Teufel et al. |
| 5,263,596 A | 11/1993 | Williams |
| 5,282,678 A | 2/1994 | Teufel et al. |
| 5,322,365 A | 6/1994 | Teufel et al. |
| 5,346,297 A | 9/1994 | Colson, Jr. et al. |
| 5,377,864 A | 1/1995 | Blechl et al. |
| 5,404,384 A | 4/1995 | Colburn et al. |
| 5,405,048 A | 4/1995 | Rogers et al. |
| 5,445,295 A | 8/1995 | Brown |
| 5,460,294 A | 10/1995 | Williams |
| 5,520,450 A | 5/1996 | Colson, Jr. et al. |
| 5,533,079 A | 7/1996 | Colburn et al. |
| 5,580,155 A | 12/1996 | Hildebrand et al. |
| 5,713,485 A | 2/1998 | Liff et al. |
| 5,724,764 A | 3/1998 | Alsup |
| 5,743,607 A | 4/1998 | Teufel et al. |
| 5,745,366 A | 4/1998 | Higham et al. |
| 5,790,409 A | 8/1998 | Fedor et al. |
| 5,797,515 A | 8/1998 | Liff et al. |
| 5,805,456 A | 9/1998 | Higham et al. |
| 5,839,257 A | 11/1998 | Soderstrom et al. |
| 5,848,593 A | 12/1998 | McGrady et al. |
| 5,905,653 A * | 5/1999 | Higham ............. G07F 17/0092 312/215 |
| 5,912,818 A | 6/1999 | McGrady et al. |
| 5,913,582 A * | 6/1999 | Coonan ................. A47B 21/00 312/223.3 |
| 5,927,540 A | 7/1999 | Godlewski |
| 5,961,036 A | 10/1999 | Michael et al. |
| 6,011,999 A | 1/2000 | Holmes |
| 6,019,249 A | 2/2000 | Michael et al. |
| 6,068,156 A | 5/2000 | Liff et al. |
| 6,073,834 A | 6/2000 | Michael et al. |
| 6,109,774 A | 8/2000 | Holmes et al. |
| 6,116,461 A | 9/2000 | Broadfield et al. |
| 6,151,536 A * | 11/2000 | Arnold ................ G07F 17/0092 700/236 |
| 6,163,737 A | 12/2000 | Fedor et al. |
| 6,170,230 B1 | 1/2001 | Chudy et al. |
| 6,170,929 B1 | 1/2001 | Wilson et al. |
| 6,175,779 B1 | 1/2001 | Barrett |
| 6,206,590 B1 * | 3/2001 | Thomas ................. B41J 3/4075 221/2 |
| 6,256,967 B1 | 7/2001 | Hebron et al. |
| 6,338,007 B1 | 1/2002 | Broadfield et al. |
| 6,401,991 B1 | 6/2002 | Eannone |
| 6,427,865 B1 | 8/2002 | Stillwell et al. |
| 6,471,089 B2 | 10/2002 | Liff et al. |
| 6,502,718 B2 | 1/2003 | Fitzgerald et al. |
| 6,564,121 B1 | 5/2003 | Wallace et al. |
| 6,581,798 B2 | 6/2003 | Liff et al. |
| 6,594,549 B2 | 7/2003 | Siegel |
| 6,609,047 B1 | 8/2003 | Lipps |
| 6,625,952 B1 | 9/2003 | Chudy et al. |
| 6,650,964 B2 | 11/2003 | Spano, Jr. et al. |
| 6,658,322 B1 | 12/2003 | Frederick et al. |
| 6,662,081 B1 | 12/2003 | Jacober et al. |
| 6,683,784 B1 * | 1/2004 | Bidwell .................. A61B 8/00 248/122.1 |
| 6,735,497 B2 | 5/2004 | Wallace et al. |
| 6,742,671 B2 | 6/2004 | Hebron et al. |
| 6,746,091 B2 | 6/2004 | Friar et al. |
| 6,760,643 B2 | 7/2004 | Lipps |
| 6,775,591 B1 | 8/2004 | Shoenfeld |
| 6,776,304 B2 | 8/2004 | Liff et al. |
| 6,776,306 B1 | 8/2004 | Michael et al. |
| 6,785,589 B2 | 8/2004 | Eggenberger et al. |
| 6,788,997 B1 | 9/2004 | Frederick |
| 6,814,254 B2 | 11/2004 | Liff et al. |
| 6,814,255 B2 | 11/2004 | Liff et al. |
| 6,847,861 B2 | 1/2005 | Lunak et al. |
| 6,895,304 B2 | 5/2005 | Spano, Jr. et al. |
| 6,902,083 B1 | 6/2005 | Michael et al. |
| 6,963,791 B1 | 11/2005 | Frederick et al. |
| 6,975,922 B2 | 12/2005 | Duncan et al. |
| 6,985,797 B2 | 1/2006 | Spano, Jr. et al. |
| 6,996,455 B2 | 2/2006 | Eggenberger et al. |
| 6,997,377 B2 | 2/2006 | Washington et al. |
| 7,006,893 B2 | 2/2006 | Hart et al. |
| 7,010,389 B2 | 4/2006 | Lunak et al. |
| 7,040,504 B2 | 5/2006 | Broadfield et al. |
| 7,044,569 B1 | 5/2006 | Relyea et al. |
| 7,048,142 B1 | 5/2006 | Michael et al. |
| 7,052,097 B2 | 5/2006 | Meek, Jr. et al. |
| 7,072,737 B2 | 7/2006 | Lunak et al. |
| 7,077,286 B2 | 7/2006 | Shows et al. |
| 7,151,982 B2 | 12/2006 | Liff et al. |
| 7,152,441 B2 | 12/2006 | Friar et al. |
| 7,228,200 B2 | 6/2007 | Baker et al. |
| 7,258,241 B2 | 8/2007 | Reid |
| 7,258,249 B1 | 8/2007 | Frederick et al. |
| 7,262,698 B1 | 8/2007 | Frederick et al. |
| 7,263,410 B1 | 8/2007 | Frederick et al. |
| 7,286,900 B1 | 10/2007 | Frederick et al. |
| 7,293,672 B2 | 11/2007 | Mori et al. |
| 7,293,673 B2 | 11/2007 | Savage et al. |
| 7,349,858 B1 | 3/2008 | McGrady et al. |
| 7,367,685 B2 | 5/2008 | Moll |
| 7,395,945 B2 | 7/2008 | Godlewski |
| 7,426,425 B2 | 9/2008 | Meek, Jr. et al. |
| 7,427,002 B2 | 9/2008 | Liff et al. |
| 7,427,022 B2 | 9/2008 | Yokota et al. |
| 7,434,704 B2 | 10/2008 | Yuyama et al. |
| 7,463,947 B1 | 12/2008 | Frederick et al. |
| 7,464,832 B2 | 12/2008 | Lee |
| 7,467,093 B1 | 12/2008 | Newton et al. |
| 7,502,666 B2 | 3/2009 | Siegel et al. |
| 7,515,988 B1 | 4/2009 | Frederick et al. |
| 7,596,427 B1 | 9/2009 | Frederick et al. |
| 7,630,789 B2 | 12/2009 | Broadfield et al. |
| 7,630,791 B2 | 12/2009 | Nguyen et al. |
| 7,685,026 B1 | 3/2010 | McGrady et al. |
| 7,689,316 B1 | 3/2010 | Frederick et al. |
| 7,689,317 B2 | 3/2010 | McGrady et al. |
| 7,719,420 B2 | 5/2010 | Christie et al. |
| 7,751,932 B1 | 7/2010 | Fedor et al. |
| 7,805,216 B2 | 9/2010 | Shows et al. |
| 7,823,993 B2 | 11/2010 | Ostrowski |
| 7,835,819 B2 | 11/2010 | Duncan et al. |
| 7,848,846 B2 | 12/2010 | Uema et al. |
| 7,991,507 B2 | 8/2011 | Liff et al. |
| 8,068,932 B2 | 11/2011 | Kirzinger |
| 8,096,628 B2 | 1/2012 | Ostrowski |
| 8,197,017 B2 | 6/2012 | Rahilly |
| 8,231,749 B2 | 7/2012 | Dent et al. |
| 8,234,008 B2 | 7/2012 | Weber |
| 8,423,180 B1 | 4/2013 | Frederick et al. |
| 8,588,966 B2 | 11/2013 | Michael |
| 8,744,621 B2 | 6/2014 | Michael |
| 8,746,908 B2 | 6/2014 | Michael |
| 9,121,197 B2 | 9/2015 | Michael |
| 2001/0019065 A1 | 9/2001 | William et al. |
| 2001/0044731 A1 | 11/2001 | Coffman et al. |
| 2003/0088333 A1 | 5/2003 | Liff et al. |
| 2003/0098984 A1 * | 5/2003 | Botten ................. B41J 11/0075 358/1.4 |
| 2004/0026442 A1 | 2/2004 | Hutchinson |
| 2004/0104652 A1 | 6/2004 | Holmes et al. |
| 2004/0134043 A1 | 7/2004 | Uema et al. |
| 2004/0158350 A1 | 8/2004 | Ostergaard et al. |
| 2004/0225409 A1 | 11/2004 | Duncan et al. |
| 2004/0246716 A1 | 12/2004 | Hubert et al. |
| 2005/0145644 A1 | 7/2005 | Mori et al. |
| 2006/0079994 A1 | 4/2006 | Chu et al. |
| 2006/0125356 A1 | 6/2006 | Meek, Jr. et al. |

(56) References Cited

U.S. PATENT DOCUMENTS

| | | |
|---|---|---|
| 2006/0151517 A1 | 7/2006 | Varis |
| 2006/0197419 A1 | 9/2006 | Sorenson |
| 2006/0277269 A1 | 12/2006 | Dent et al. |
| 2007/0023193 A1 | 2/2007 | King |
| 2007/0078562 A1 | 4/2007 | Park, IV |
| 2007/0171647 A1 | 7/2007 | Artwohl et al. |
| 2007/0208598 A1 | 9/2007 | McGrady et al. |
| 2007/0262147 A1 | 11/2007 | Braun et al. |
| 2007/0283733 A1 | 12/2007 | Ratkus et al. |
| 2008/0065264 A1 | 3/2008 | Omura et al. |
| 2008/0129171 A1 | 6/2008 | Greiner |
| 2008/0190953 A1* | 8/2008 | Mallett .................. A61L 11/00 221/13 |
| 2009/0015116 A1 | 1/2009 | Arceta et al. |
| 2009/0055018 A1 | 2/2009 | Meek, Jr. et al. |
| 2009/0108016 A1 | 4/2009 | Brown et al. |
| 2009/0114672 A1 | 5/2009 | Schifman et al. |
| 2009/0116228 A1 | 5/2009 | Otsuki et al. |
| 2009/0134802 A1 | 5/2009 | Oketani et al. |
| 2009/0138122 A1 | 5/2009 | Wagner |
| 2009/0178427 A1 | 7/2009 | Eichman |
| 2009/0231132 A1 | 9/2009 | Shoenfield |
| 2009/0244884 A1 | 10/2009 | Trulaske, Sr. |
| 2010/0039811 A1 | 2/2010 | Maxik |
| 2010/0042437 A1* | 2/2010 | Levy .................... G06Q 10/087 705/3 |
| 2010/0070074 A1 | 3/2010 | Duncan et al. |
| 2010/0079240 A1 | 4/2010 | Higham |
| 2010/0170279 A1 | 7/2010 | Aoki |
| 2010/0176699 A1 | 7/2010 | Biba et al. |
| 2010/0228392 A1 | 9/2010 | Braun |
| 2010/0256800 A1 | 10/2010 | Heffron |
| 2011/0012374 A1 | 1/2011 | Ostrowski |
| 2011/0015782 A1 | 1/2011 | Chudy et al. |
| 2011/0016026 A1 | 1/2011 | Godlewski |
| 2011/0101018 A1 | 5/2011 | Shafir |
| 2011/0277493 A1 | 11/2011 | Becke et al. |
| 2012/0089248 A1 | 4/2012 | Biba et al. |

* cited by examiner

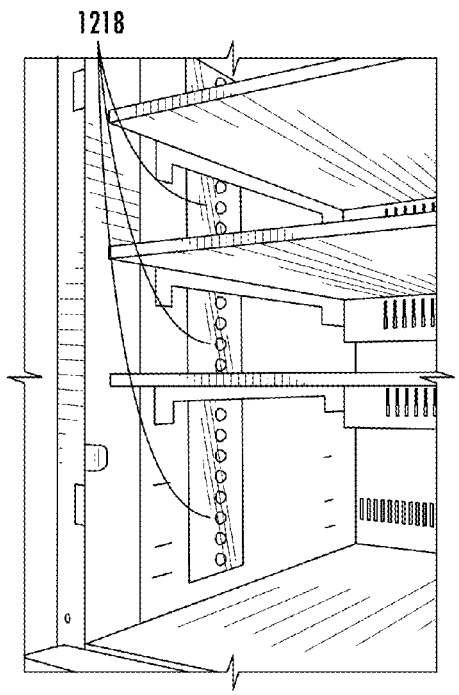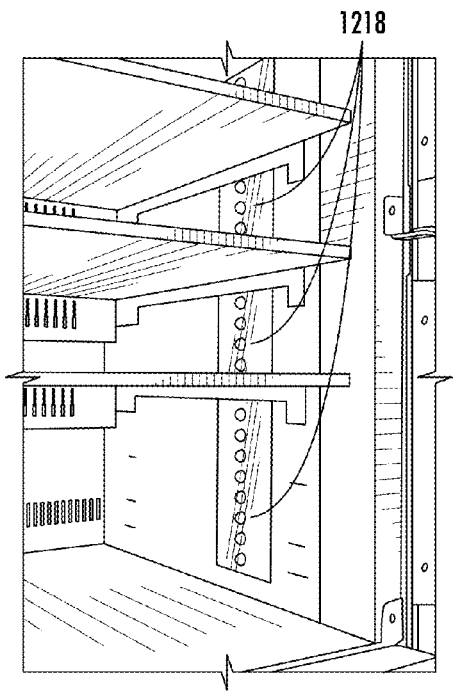
FIG. 24     FIG. 25
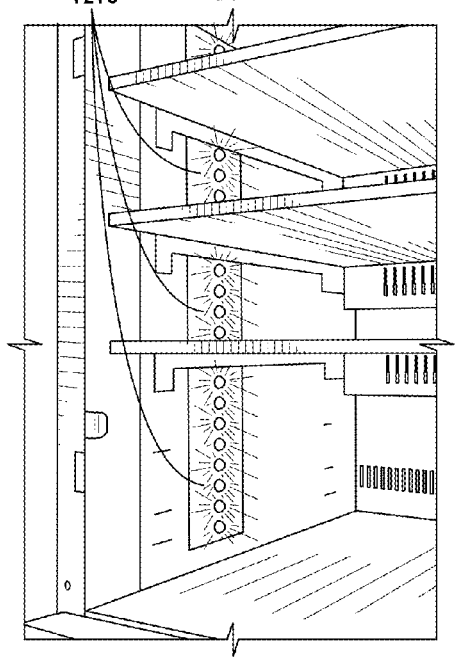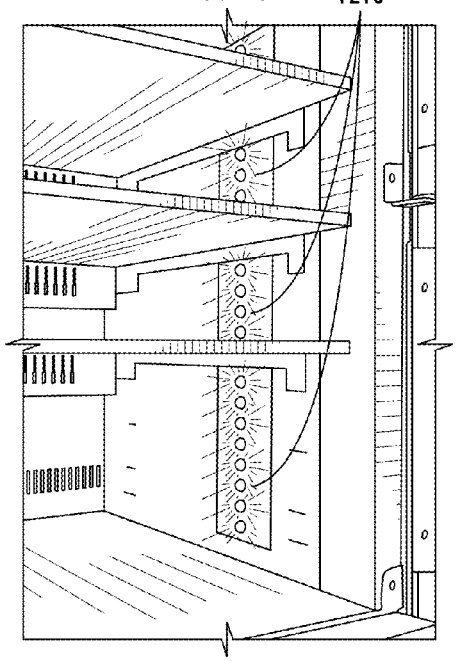
FIG. 26     FIG. 27

MEDICAL SUPPLY CABINET WITH LIGHTING FEATURES

CROSS-REFERENCE TO RELATED PATENT APPLICATIONS

This application is a continuation of U.S. application Ser. No. 14/257,785 filed Apr. 21, 2014 which is a continuation of U.S. application Ser. No. 13/015,349, filed Jan. 27, 2011, and issued as U.S. Pat. No. 8,746,908 on Jun. 10, 2014, which claims the benefit of U.S. Provisional Patent Application No. 61/336,809 filed Jan. 27, 2010, which are incorporated herein by reference in their entireties.

FIELD OF THE INVENTION

The present disclosure relates generally to the field of supply cabinet. More specifically, the present disclosure relates to a cabinet system for storing medical supplies.

BACKGROUND OF THE INVENTION

Supply cabinets having access controls are employed in a variety of medical and therapeutic settings for inventory control, tracking, and replenishment, limiting user access to specified individuals, and tracking distribution of medical supplies, medications, and controlled substances. It would be desirable to provide a medical supply cabinet having improved user interface and access controls, customizability, and lighting.

The invention provides such a supply cabinet. These and other advantages of the invention, as well as additional inventive features, will be apparent from the description of the invention provided herein.

BRIEF SUMMARY OF THE INVENTION

In one aspect, the invention provides a cabinet with electronic and manual access controls for compartments, doors for each compartment, independent access control for each compartment, and selectively operable light-emitting diode illumination for each compartment.

In another aspect, the invention provides a supply cabinet system with one or more cabinets with multiple compartments and electronic locks. Each lock is configured to control access to a compartment, and is in communication with a user access control. The user access control is configured to selectively unlock one or more compartment doors in response to a user request. Each compartment also including selectively operable light-emitting diode illumination. The electronic access control is configured to operate the light-emitting diodes at a first illumination level in response to a first operating condition, and operate the light-emitting diodes at a second illumination level in response to a second operating condition.

In yet another aspect, the invention provides a supply cabinet system including adjacent cabinets, where each cabinet has a plurality of compartments and each cabinet is affixed to an adjacent cabinet. The system also includes electronic locks, where each lock controls access to a compartment. A user access control communicates with the electronic locks, and is configured to selectively unlock one or more compartment doors in response to a user request. Each compartment includes light emitting diode illumination, with selectively operable light-emitting diodes arranged vertically within each compartment. The user access control is configured to operate the light-emitting diodes at a first illumination level in response to a first operating condition, and operate the light-emitting diodes at a second illumination level in response to a second operating condition.

Other aspects, objectives and advantages of the invention will become more apparent from the following detailed description when taken in conjunction with the accompanying drawings.

BRIEF DESCRIPTION OF THE DRAWINGS

The present disclosure will become more fully understood from the following detailed description, taken in conjunction with the accompanying figures, wherein like reference numerals refer to like elements, in which:

FIG. 24 is a perspective view of lighting features according to an exemplary embodiment from a first perspective in a first configuration;

FIG. 25 is a perspective view of lighting features according to an exemplary embodiment from a second perspective in a first configuration;

FIG. 26 is a perspective view of the lighting features of FIG. 24 from a first perspective in a second configuration;

FIG. 27 is a perspective view of the lighting features of FIG. 25 from a second perspective in a second configuration;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Before turning to the figures, which illustrate the exemplary embodiments in detail, it should be understood that the present invention is not limited to the details or methodology set forth in the description or illustrated in the figures. It should also be understood that the terminology is for the purpose of description only and should not be regarded as limiting.

All references, including publications, patent applications, and patents cited herein are hereby incorporated by reference to the same extent as if each reference were individually and specifically indicated to be incorporated by reference and were set forth in its entirety herein.

1. Cabinet Tower

Figure 1:
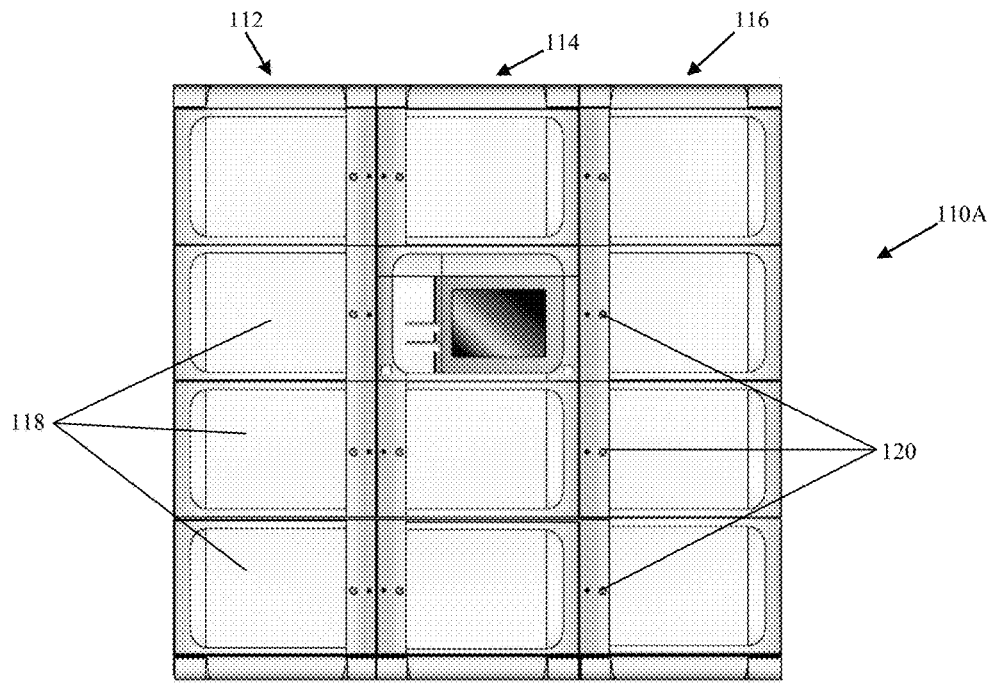
FIG. 1 is a front view of a cabinet system according to an exemplary embodiment.
Figure 2:
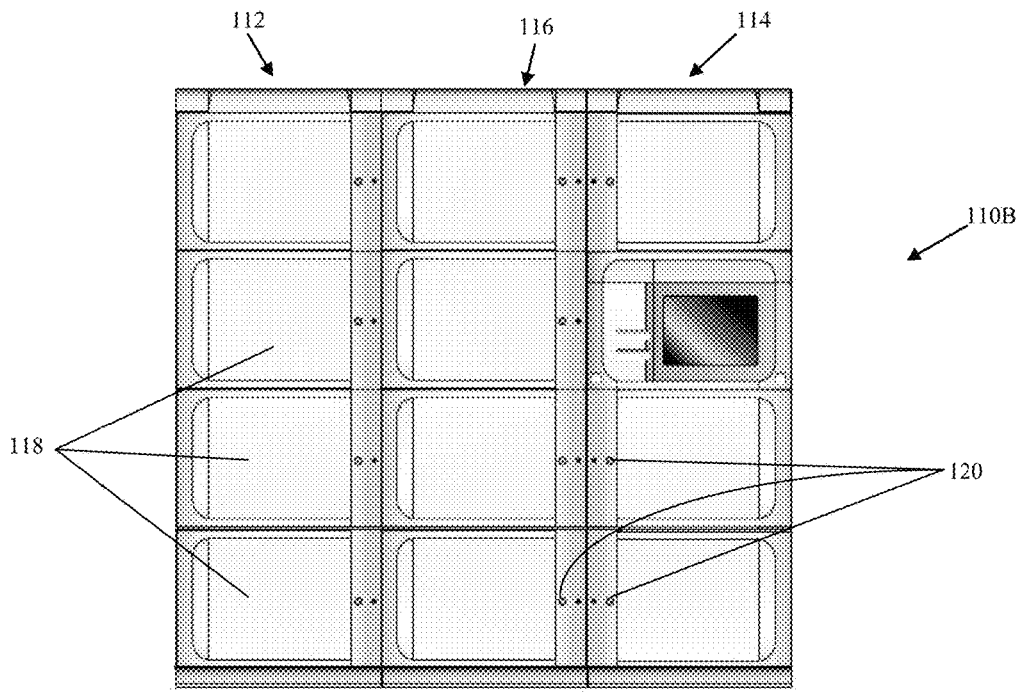
FIG. 2 is a front view of a cabinet system according to another exemplary embodiment.

Referring to FIG. 1, a cabinet system 110 includes three towers 112, 114, 116 (e.g., supply towers, cabinets) coupled together in a first configuration 110A. Each tower 112, 114, 116 includes four doors 118, which may be right hinged or left hinged. Each door 118 has a manual lock 120. In other embodiments, the towers may include other numbers of doors. In some embodiments, the doors 118 may not include locks, or may include electric locks (e.g., solenoid latch). The towers 112, 114, 116 may be fastened to each other in any order—for example, in FIG. 2 the towers 112, 114, 116 are coupled together in a different configuration 110B.

Figure 61:
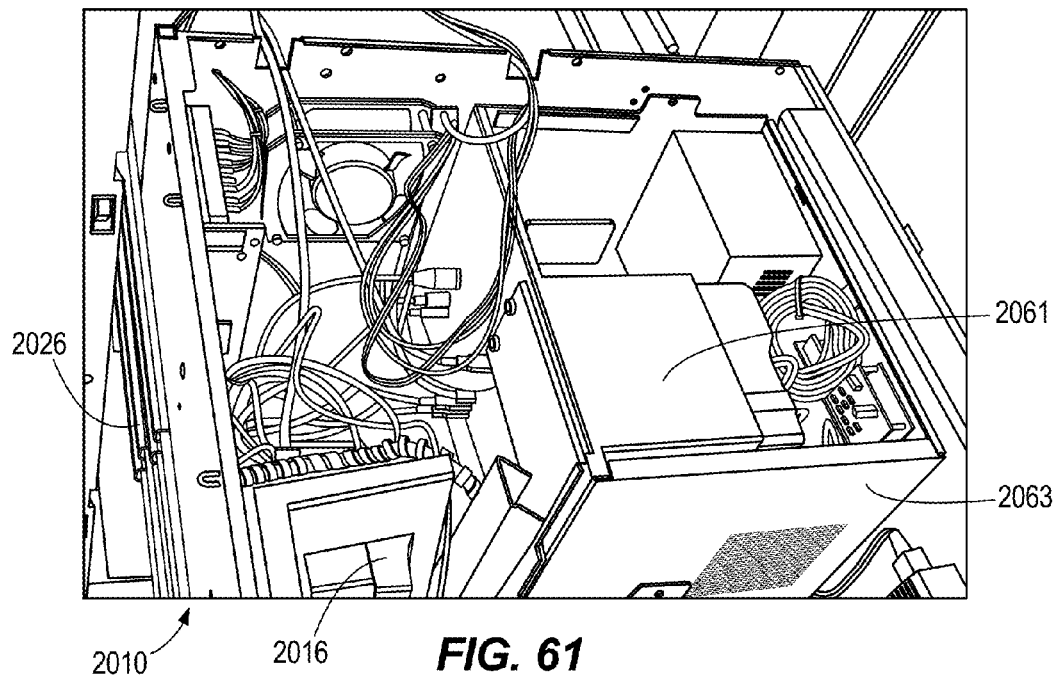
FIG. 61 is a first perspective view of internal components of the user interface of FIG. 47 according to an exemplary embodiment.

The tower 114 (e.g., user access center tower) includes a user interface 122 (e.g., user access center, controller, computer monitor and keyboard, etc.). A user may control features of the cabinet system 110 (e.g., locks, lighting, etc.) or catalog inventory of the cabinet system 110 via a processor (see, e.g., processor 2060 as shown in FIG. 61) coupled to the user interface 122. In other embodiments, features of the cabinet system 110 may be controlled, cataloged, etc., by an external computer or network of computers. In still other embodiments, the cabinet system 110 does not include a controller.

Figure 3:
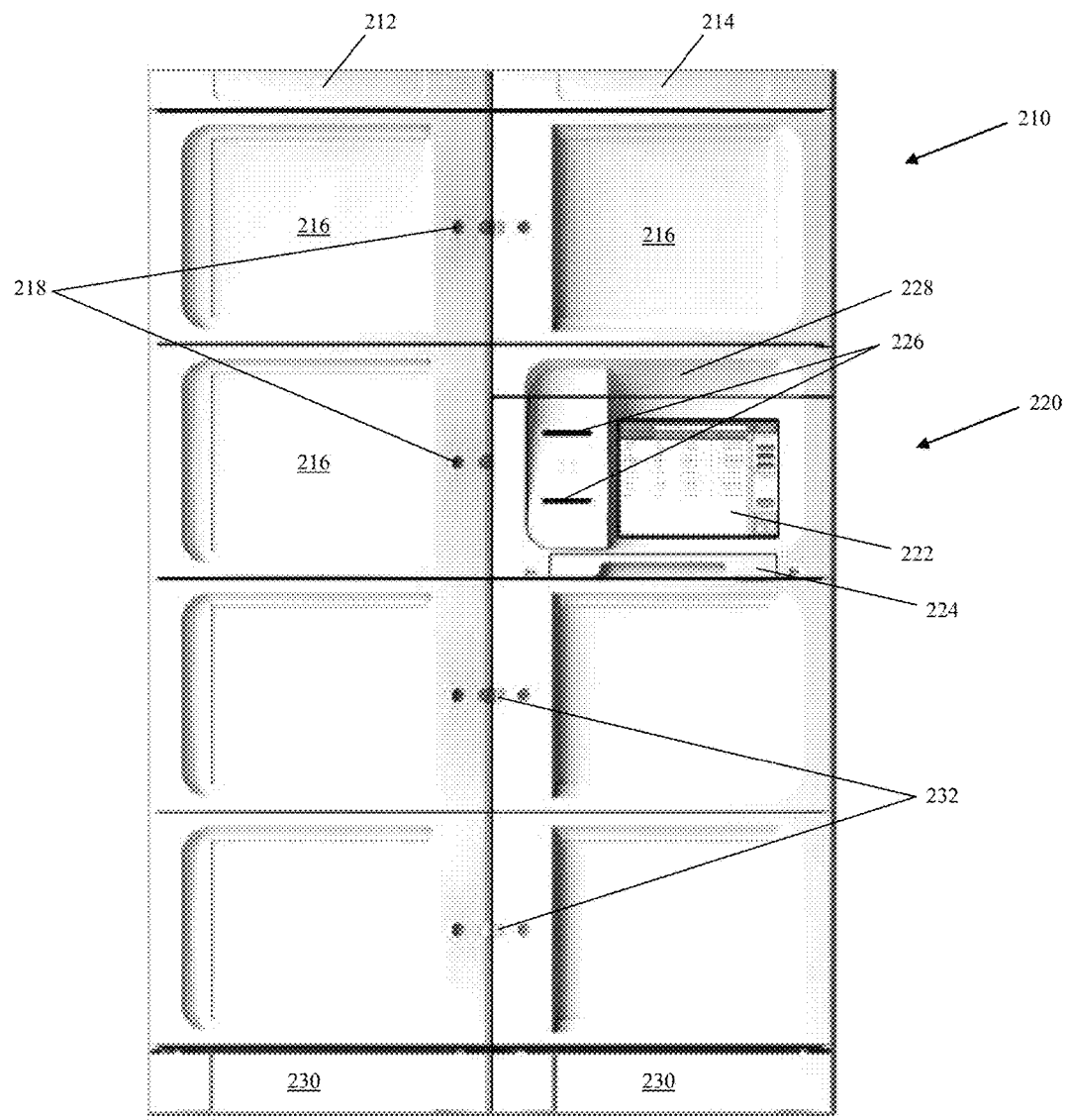
FIG. 3 is a front view of a cabinet system according to yet another exemplary embodiment.
Figure 4:
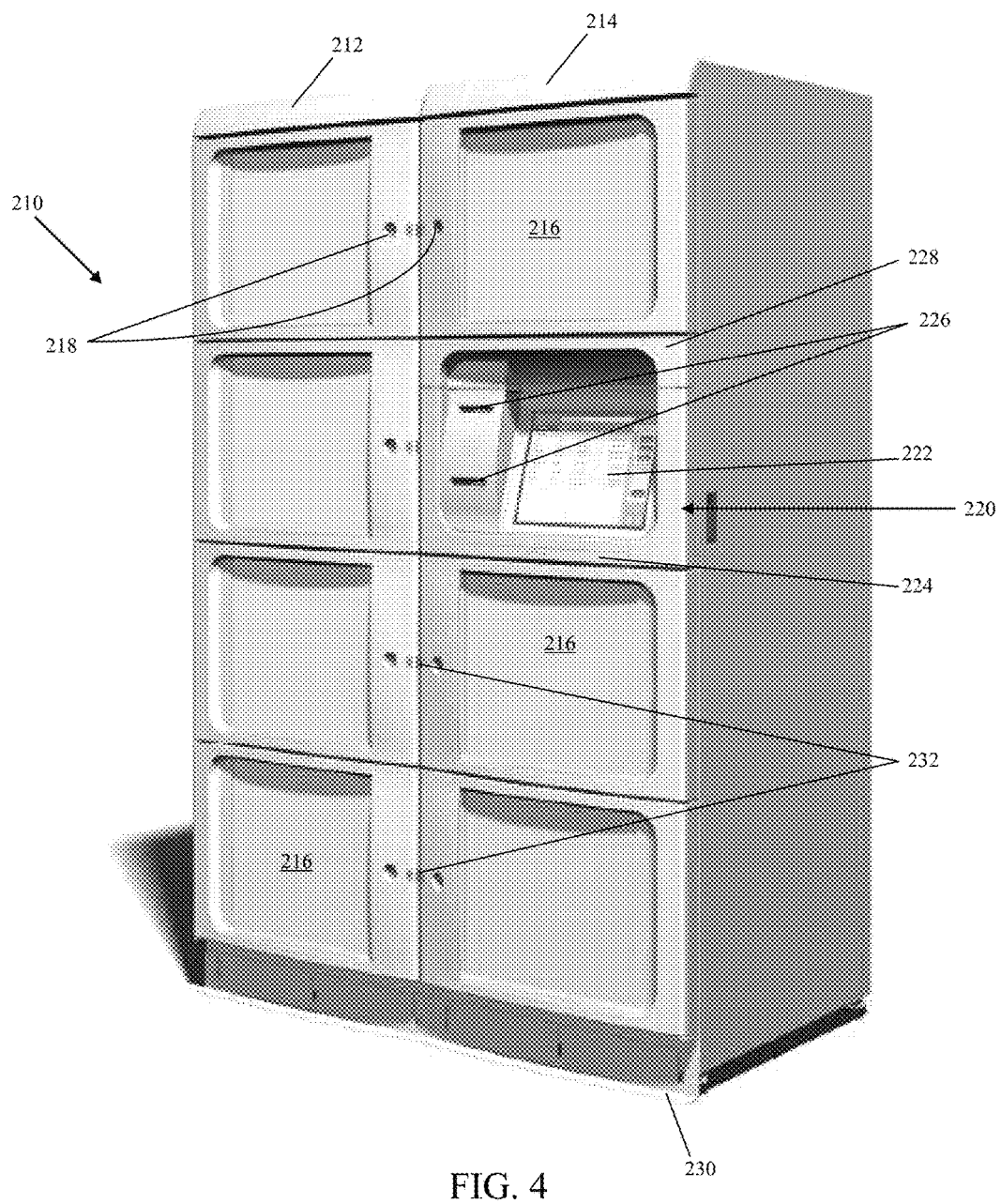
FIG. 4 is a perspective view of the cabinet system of FIG. 3.

Referring to FIGS. 3-4, a cabinet system 210 includes two towers 212, 214. Each of the towers 212, 214 includes doors 216 having locks 218. The tower 214 includes a user interface 220 having a monitor 222, an extendable keyboard 224, and printer output slots 226. A door 216 above the user interface 220 includes an extension 228 coupled to the bottom thereof. The cabinet system 210 additionally includes a stability bracket 230 (see also FIGS. 15-16) configured to increase the support base of the cabinet system 210, increasing stability. In some embodiments, the cabinet system 210 includes slots for gripping the cabinet system 210 to move the cabinet system 210. An indicator 232 may provide information to an operator, such as whether a particular door 216 is locked. Indicator 232 may be, for example, a light-emitting diode configured to visually indicate (e.g. turn on, flash, blink, pulse, etc.) the status of the door. In one embodiment, an indicator 232 may be configured to turn fully on when a door in unlocked, flash or blink when a door is unlocked and to further indicate the location of a supply item, and turn off when the door is opened or when the door is locked.

Figure 5:
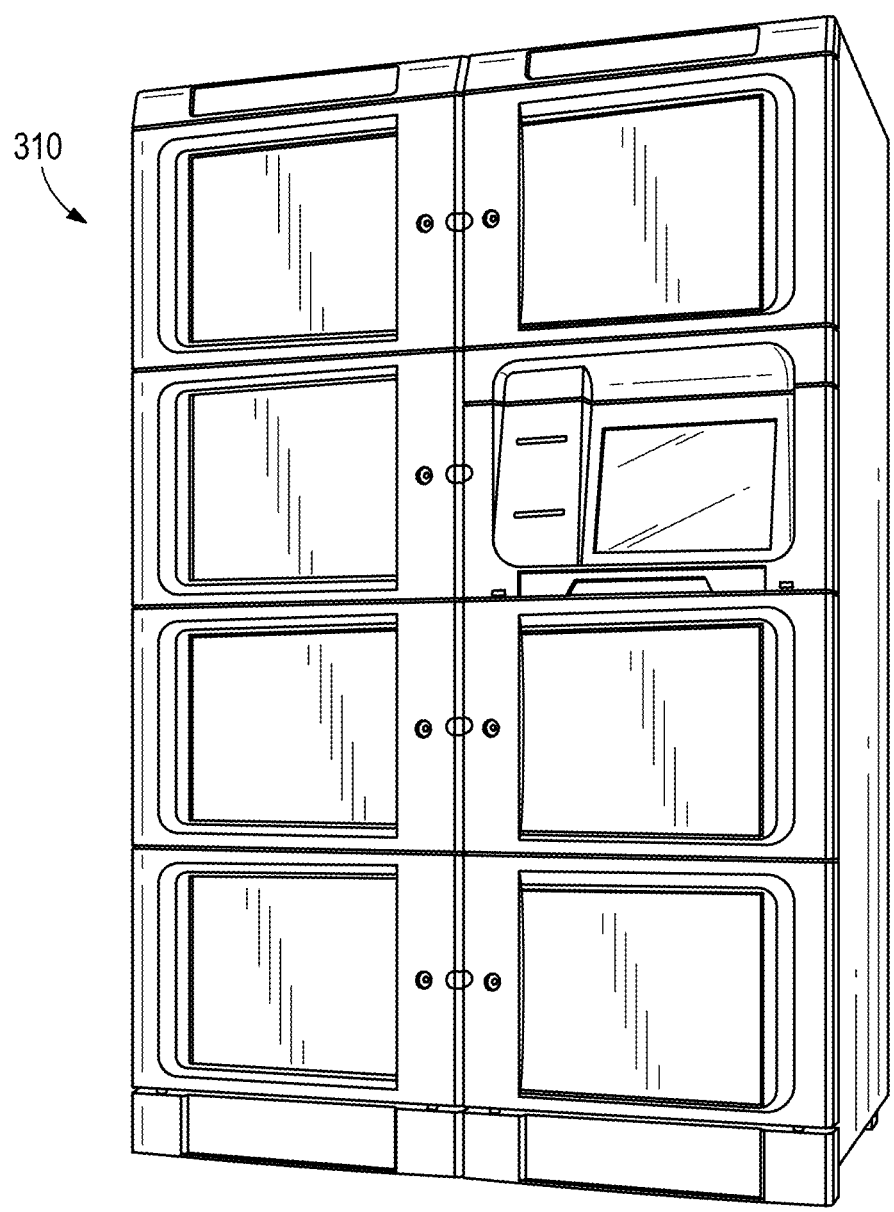
FIG. 5 is a perspective view of a cabinet system of according to another embodiment.
Figure 6:
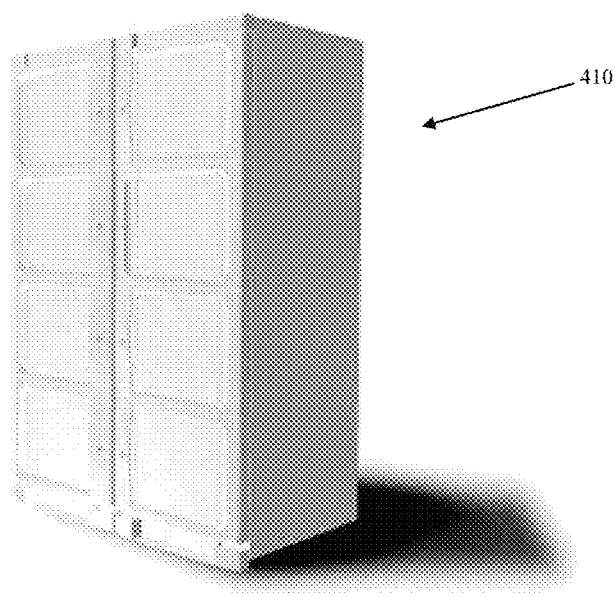
FIG. 6 is a perspective view of a cabinet system of according to still another embodiment.
Figure 7:
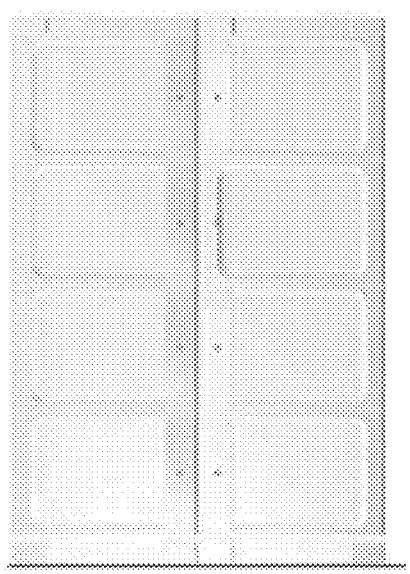
FIG. 7 is a front view of the cabinet system of FIG. 6.
Figure 8:
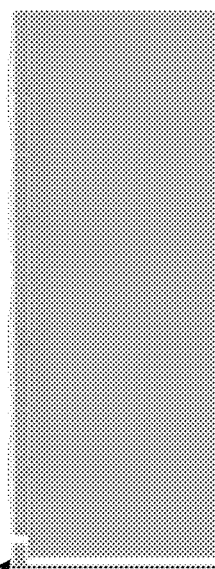
FIG. 8 is a side view of the cabinet system of FIG. 6.
Figure 9:
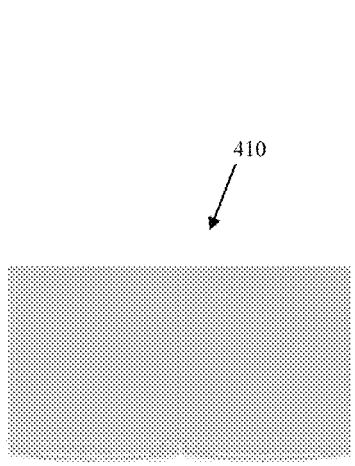
FIG. 9 is a top view of the cabinet system of FIG. 6.
Figure 10:
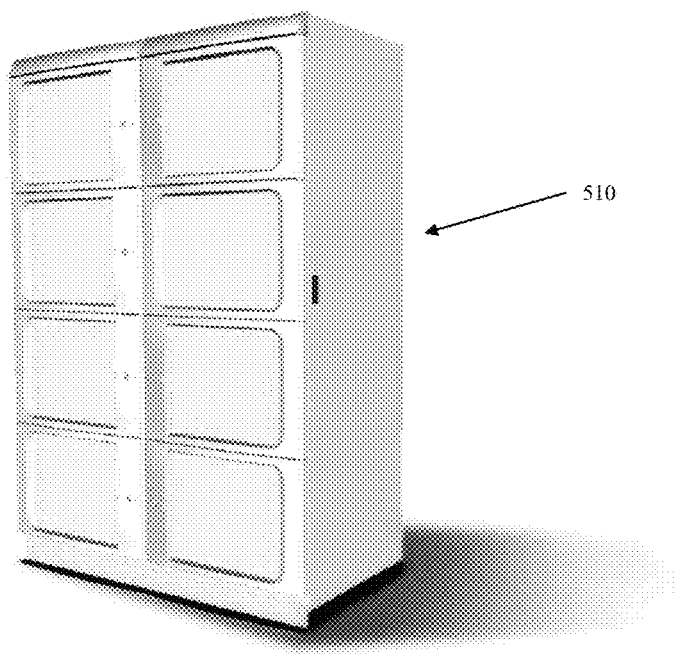
FIG. 10 is a perspective view of a cabinet system of according to another embodiment.
Figures 11, 12, 13:
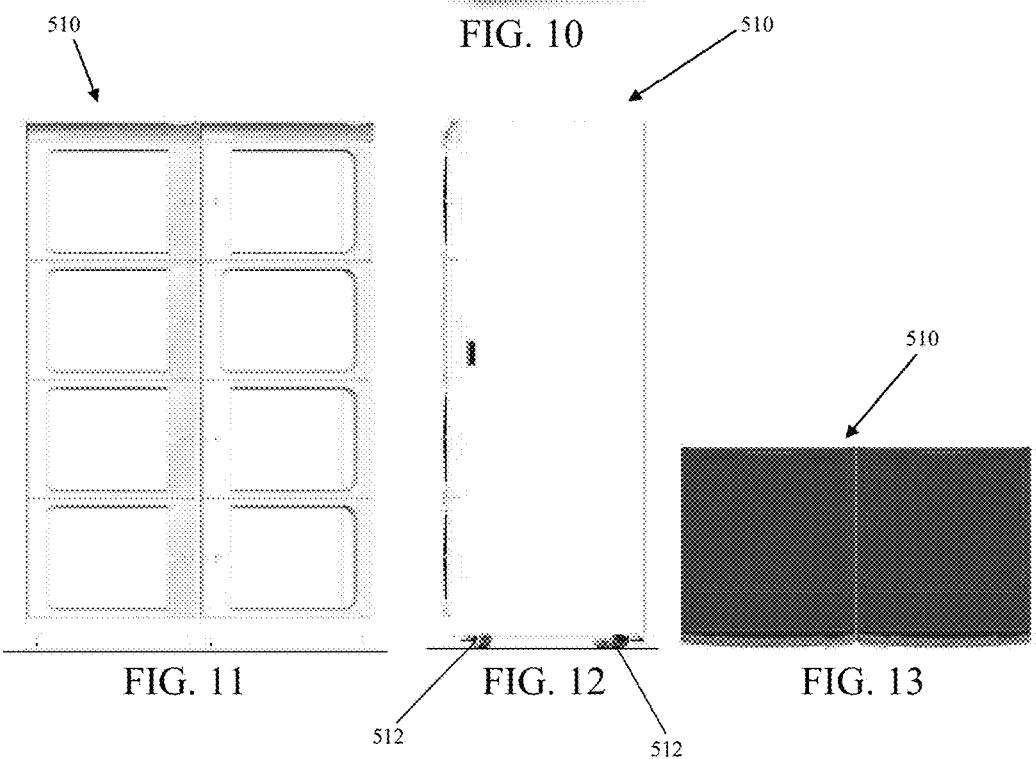
FIG. 11 is a front view of the cabinet system of FIG. 10.
FIG. 12 is a side view of the cabinet system of FIG. 10.
FIG. 13 is a top view of the cabinet system of FIG. 10.

Referring now to FIGS. 5-6, 10, cabinet systems 310, 410, 510 each include components similar to those discussed with regard to cabinet systems 110, 210. Cabinet systems 410,510 do not include a user interface. FIGS. 7-9 show the cabinet system 410 from different view points. Referring specifically to FIG. 8, a stability bracket 412 extends the support base of the cabinet system 410. FIGS. 11-13 show the cabinet system 510 from different view points, where casters 512 are shown in FIG. 12 below the cabinet system 510.

Figure 14:
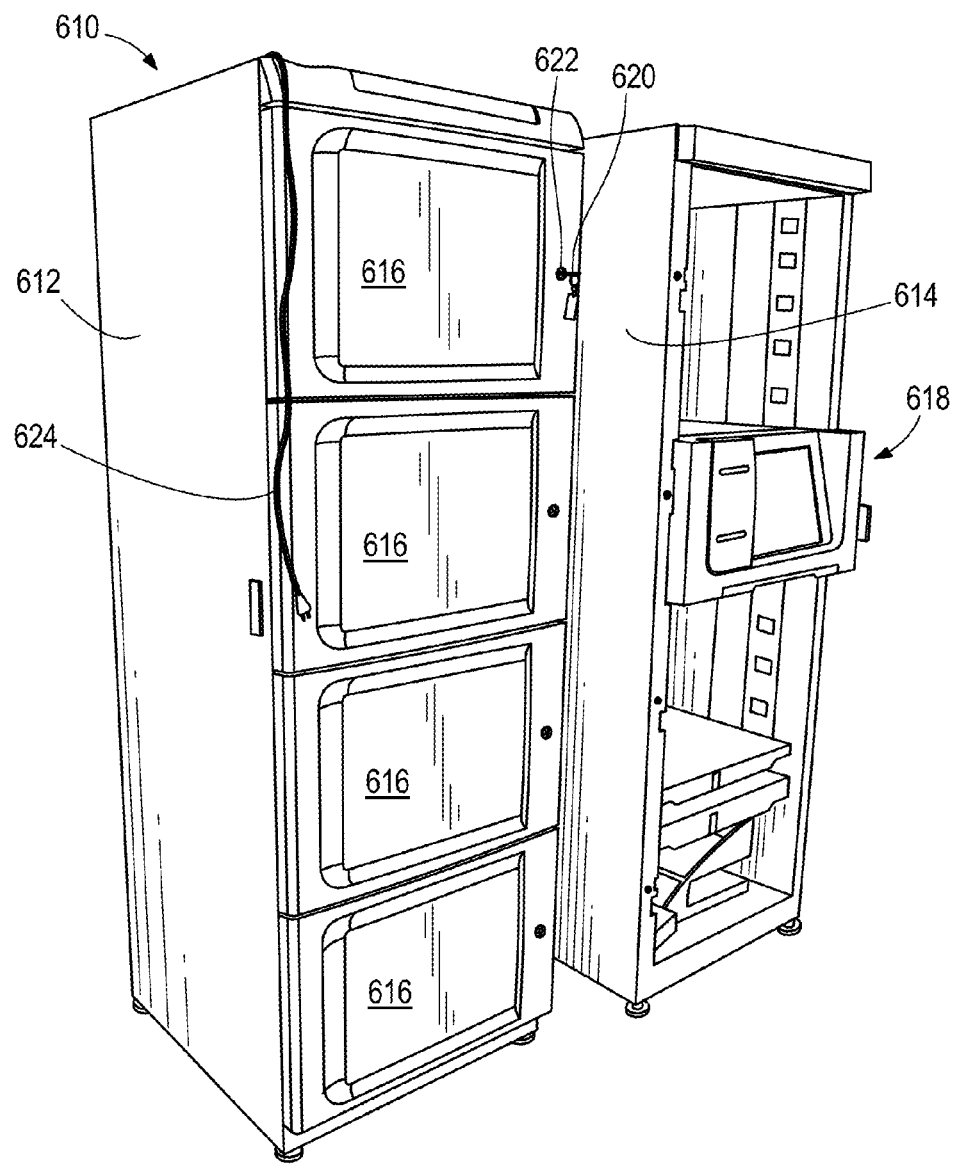
FIG. 14 is a perspective view of a cabinet system according to yet another embodiment.

Referring now to FIG. 14, a cabinet system 610 includes a first tower 612 having four doors 616, and a second tower 614 in a partially-assembled configuration. In some embodiments, the doors 616 are transparent or translucent, while in other exemplary embodiments, the doors 616 are generally opaque. Doors 616 may be wholly transparent or translucent, e.g. formed from a sheet of transparent or translucent material such as glass or plastic, or may be partially transparent or translucent, e.g. contain a transparent or translucent window within a door frame. A key 620 is removably inserted into a key hole 622 of the first tower 612. In some embodiments, all key holes (of one or more than one tower) share a common key. The first and second towers 612, 614 are configured to be fastened together, or to operate separate from each other. The second tower 614 includes a user interface 618. Additionally, a power cord 624 is coupled to the first tower 612.

II. Support Bracket

Figure 15:
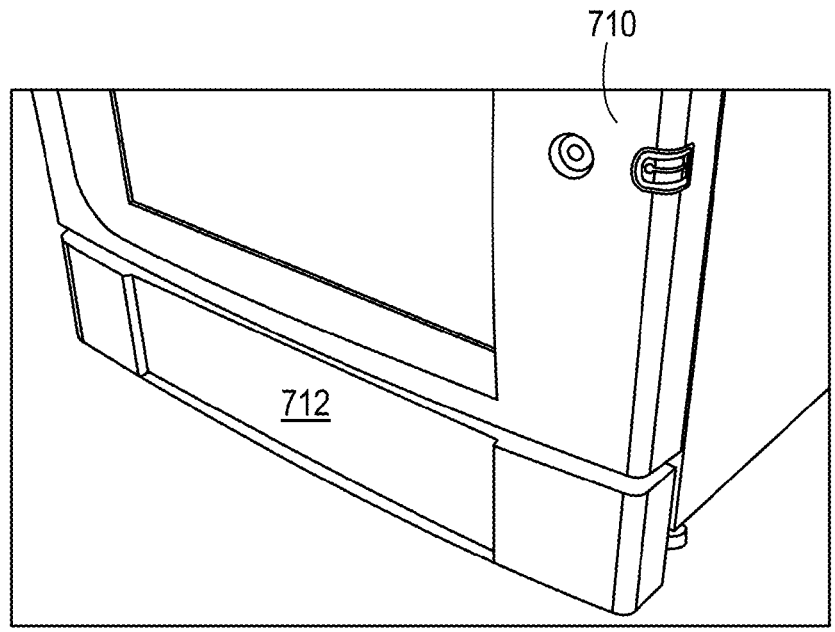
FIG. 15 is a perspective view of a support bracket of the cabinet system of FIG. 14 in a first configuration.
Figure 16:
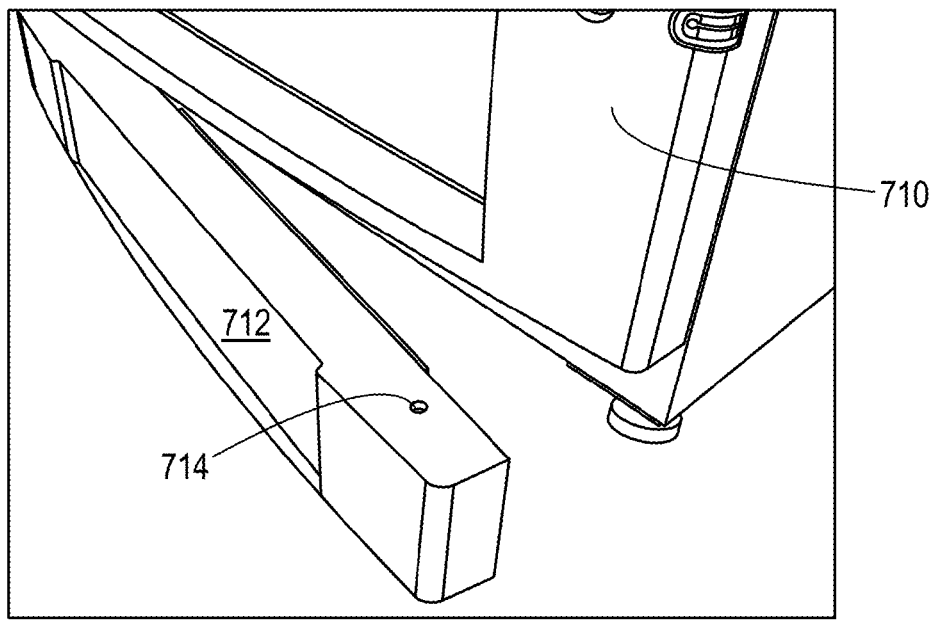
FIG. 16 is a perspective view of the support bracket of the cabinet system of FIG. 14 in a second configuration.
Figure 17:
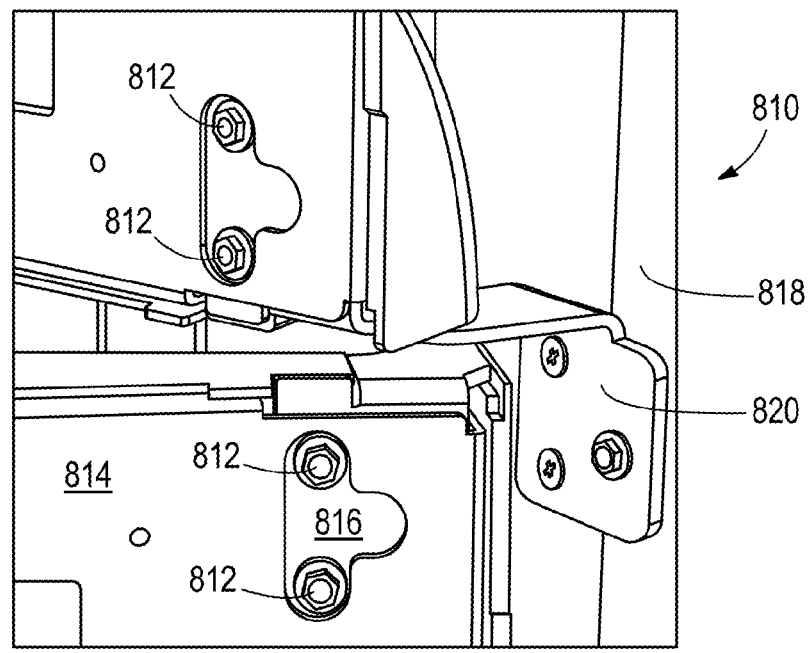
FIG. 17 is a perspective view of a hinge assembly according to a exemplary embodiment.

Referring to FIGS. 15-16, a cabinet tower 710 includes a support bracket 712 (e.g., extension, stability bracket, etc.). FIG. 15 shows the support bracket 712 in an operational configuration, while FIG. 16 shows the support bracket 712 partially disassembled from the cabinet tower 710. The support bracket 712 may include fastening structures 714 (e.g., bolt holes), and is configured to withstand a large weight without deformation (e.g., a moment greater than 1000 ft-lbf; greater than 2000 ft-lbf). As mentioned, the support bracket 712 is configured to extend the support base of the cabinet tower 710 by moving further forward the point about which the cabinet tower 710 would rotate upon tilting or tipping forward.

III. Hinge Assembly

Referring to FIGS. 17-20, a first hinge assembly 810 (FIG. 17) and a second hinge assembly 910 (FIGS. 18-19) each include a pin (e.g., pivot) and fasteners 812, 912 (e.g., threaded fasteners) coupling a door 814, 914 (fastened to first bracket 816, 916) to a cabinet tower 818,918 (fastened to a second bracket 820, 920). The second hinge assembly 910 is preferred over the first hinge assembly 810 because the portion of the door 914 to which the hinge assembly 910 is fastened includes a cut-out portion 922 thereof. The cut-out portion 922 allows for easier coupling and decoupling of the door 914 from the second hinge assembly 910, when compared to the first hinge assembly 810. According to an exemplary embodiment, a user need only remove (e.g., unscrew) the fasteners 912 to remove the door 914 from the hinge assembly 910.

Figure 18:
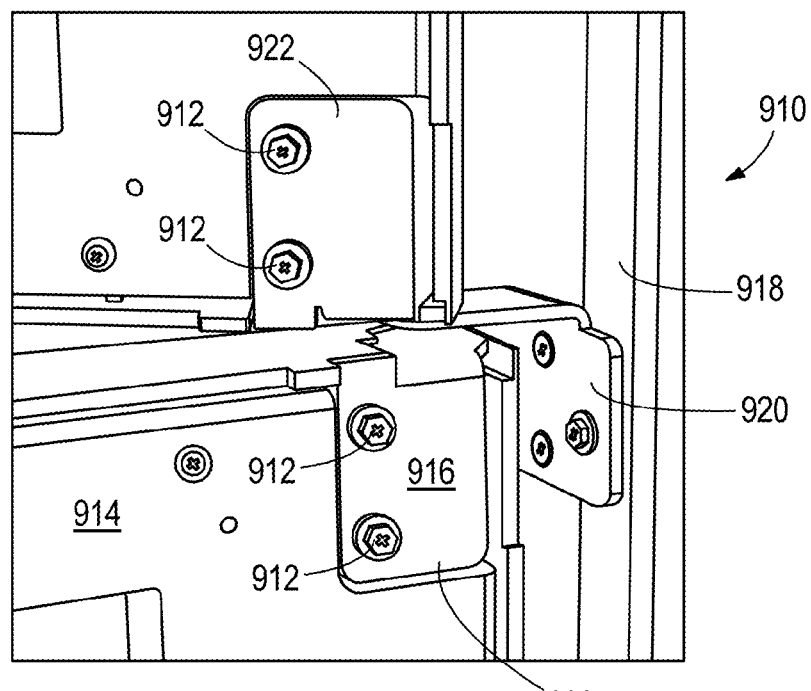
FIG. 18 is a perspective view of a hinge assembly in a first configuration according to another exemplary embodiment.
Figure 19:
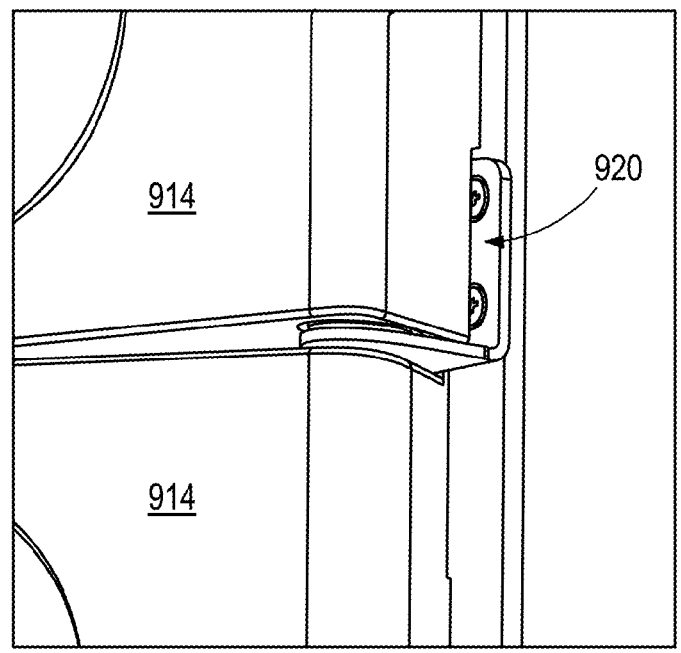
FIG. 19 is a perspective view of the hinge assembly of FIG. 18 in a second configuration.
Figure 20:
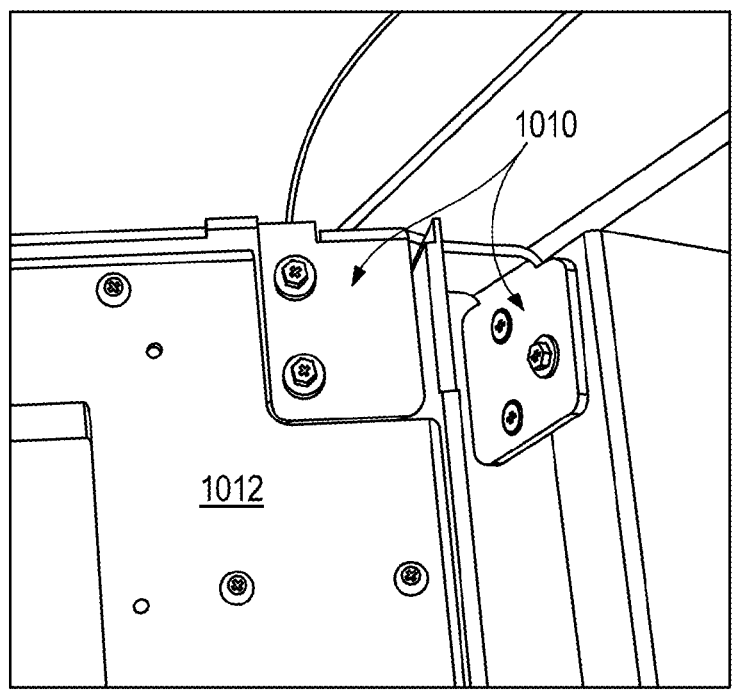
FIG. 20 is a perspective view of a hinge assembly according to yet another exemplary embodiment.

FIG. 19 shows the hinge assembly 910 from outside of the door 914, and FIG. 20 shows a hinge assembly 1010 of a design similar to the second hinge assembly 910 of FIGS. 18-19, but with only one door 1012 attached thereto. Each door 814, 914, 1012 may be coupled to two or more hinge assemblies 810, 910, 1010 (e.g., on top and bottom thereof).

Figure 21:
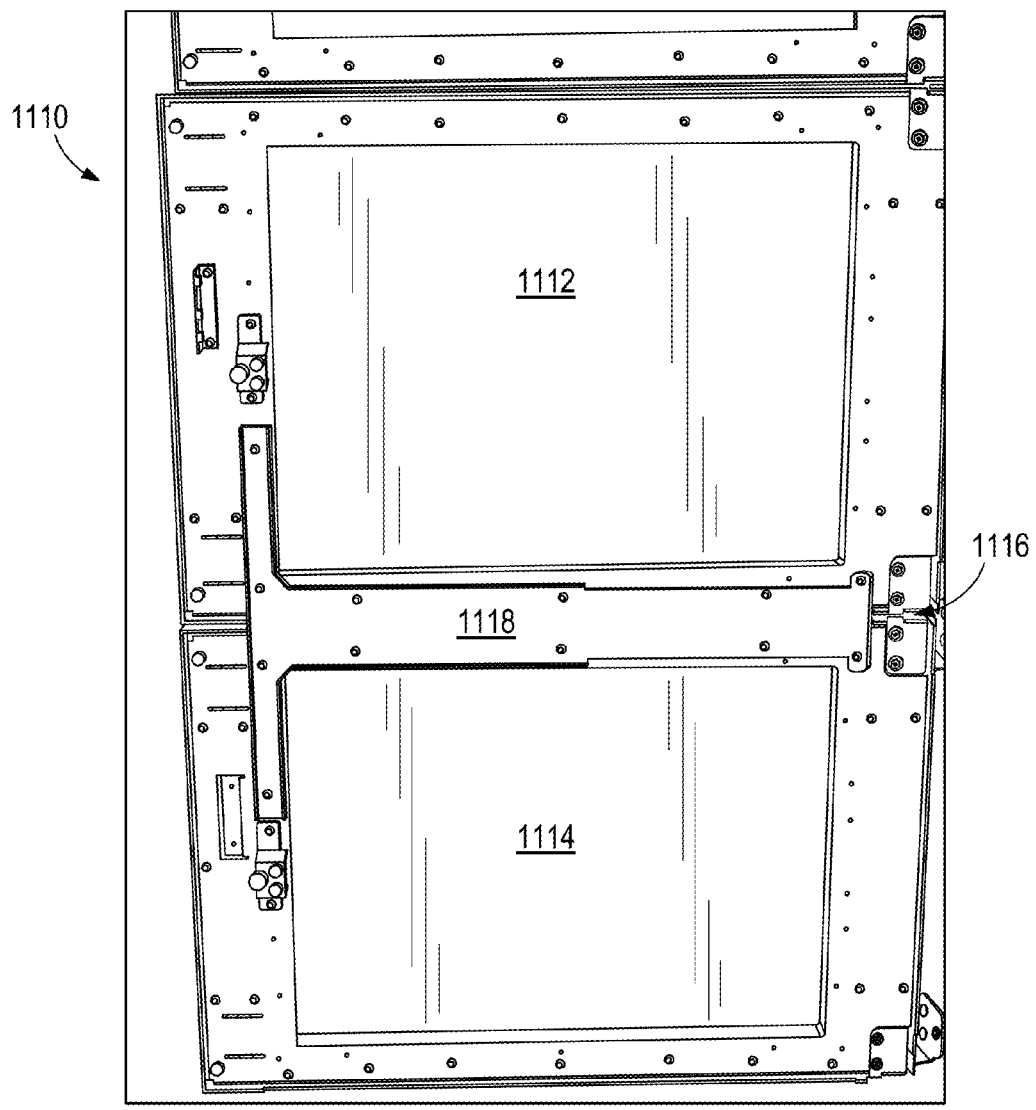
FIG. 21 is a perspective view of a door coupling assembly according to an exemplary embodiment.

Referring now to FIG. 21, a cabinet system 1110 includes two doors 1112, 1114. The two doors 1112, 1114 are fastened together by a coupling kit 1116. The coupling kit 1116 includes a bracket 1118 (e.g., T-shaped bracket) fastened to the bottom of the top door 1112 and to the top of the bottom door 1114. When the doors 1112, 1114 are fastened together with the coupling kit 1116, the two doors 1112, 1114 function as a single door, such as a door to a large compartment. Where two doors (or more) are joined by a T-shaped bracket 1118 to provide access to a large compartment, duplicate access control features (e.g., second electronic lock, second manual lock) may be removed or disengaged such that access to the large compartment is controlled by a single operation. Additionally, operation of a duplicate indicator feature 232 (as shown in FIGS. 3-4) may be disabled to indicate to a user that the doors 1112, 1114 are operable as a single door.

IV. Lighting

Figure 29:
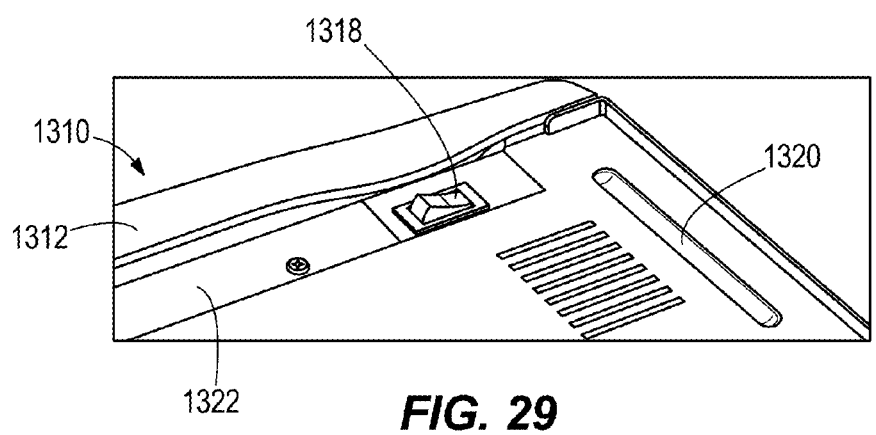
FIG. 29 is a perspective view of a portion of the top of the cabinet system of FIG. 28 in the first configuration.

Referring to FIGS. 22-27, a lighting feature 1212 of a cabinet tower 1210 includes an array of light-emitting diodes 1214 positioned within walls 1216 of the cabinet tower 1210, behind transparent or translucent panels 1218. In some embodiments, the lighting feature 1212 is activated when doors 1220 of the cabinet tower 1210 open, and is deactivated when the doors 1220 close (e.g., by way of a manual switch, optical switch, potentiometer, etc.). In some embodiments, the lighting feature 1212 may be manually activated or deactivated by a light switch (see, e.g., switch 1318 as shown in FIG. 29).

Where lighting feature 1212 includes light-emitting diodes 1214, illumination levels may be variably operated by pulse-width modulation of the power input to the light-emitting diodes 1214, to output any illumination level between zero brightness and full brightness. Illumination levels may be selectively applied to individual compartments, or uniformly to all compartments of a cabinet. In one embodiment, lighting feature 1212 is activated in at a first brightness (such as full brightness), when a door is opened, and activated at a second brightness (such as 50 percent of full brightness, 25 percent of full brightness, zero percent of full brightness) when a door is closed. In other embodiments, activation of lighting feature 1212 (preferably in a compartment having a transparent or translucent door) may be used to provide information to an operator, such as whether a particular door 216 has been placed in an unlocked condition. Lighting feature 1212 may be modulated (e.g. on-off flashing, bright-dim pulsing) to provide visual information to an operator. Lighting features 1212 of cabinet 1210 may also be placed in a second brightness mode after a period of inactivity or during defined times of day.

Figure 22:
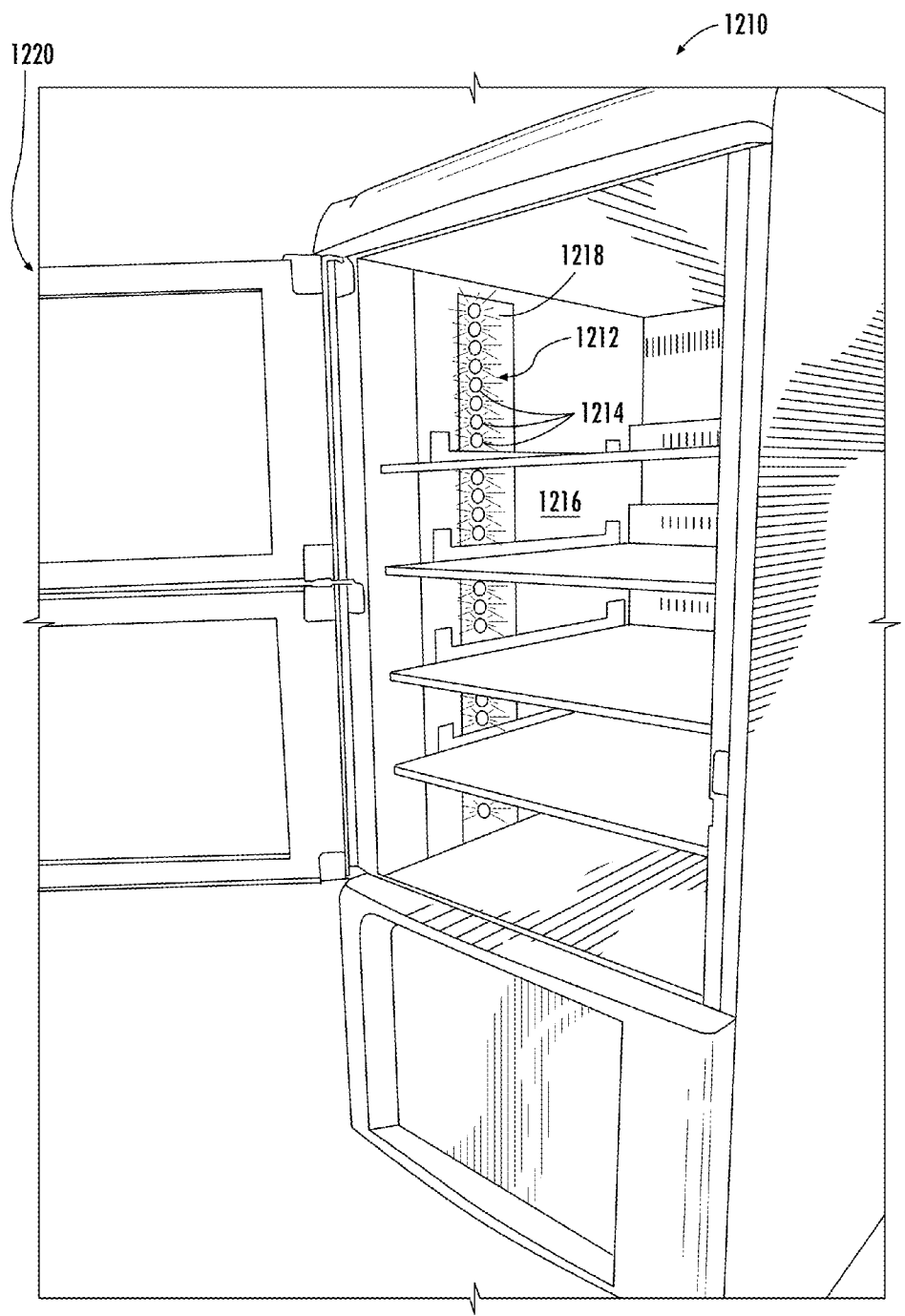
FIG. 22 is a perspective view lighting features of an upper portion of a cabinet system according to an exemplary embodiment.
Figure 23:
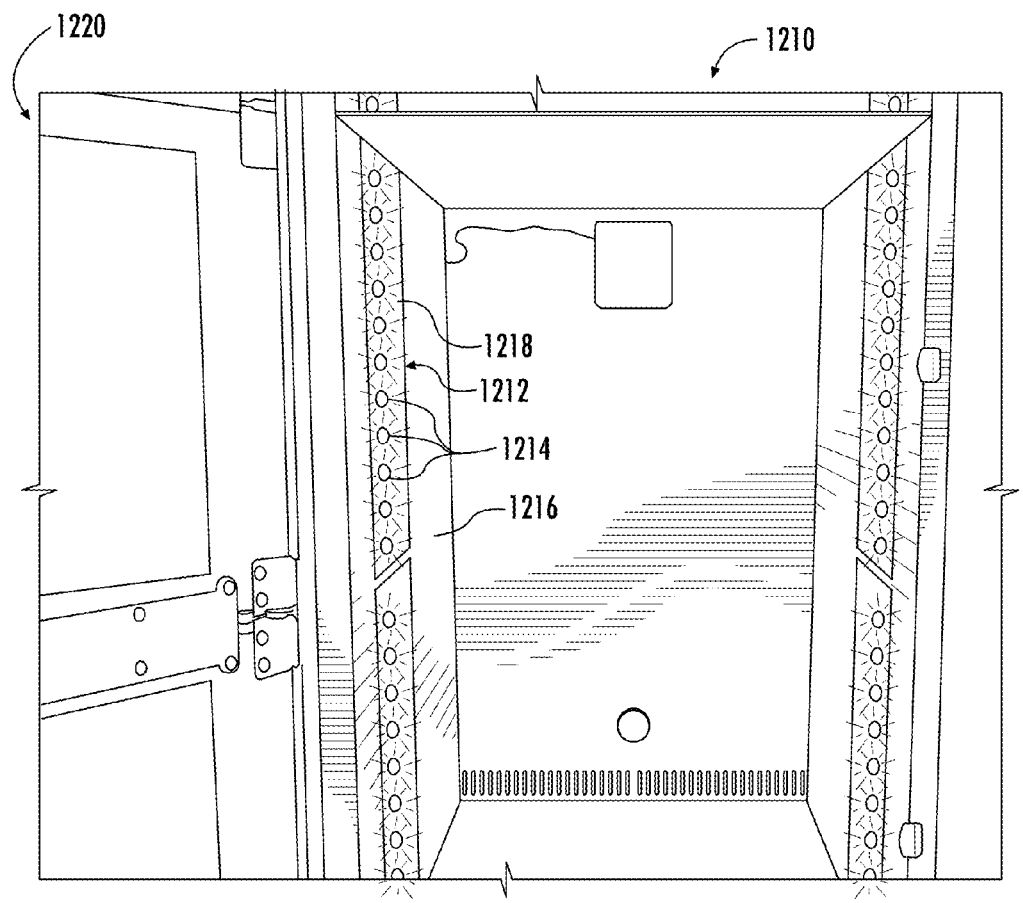
FIG. 23 is a perspective view lighting features of an lower portion of the cabinet system of FIG. 22.

In other embodiments, traditional light bulbs or other lighting elements are used. FIG. 22 shows an upper portion of the cabinet tower 1210, and FIG. 23 shows a lower portion of the cabinet tower 1210. Referring specifically to FIGS. 24-27-FIGS. 24-25 show the panels 1218 with the lighting feature 1212 deactivated, while FIGS. 26-27 show the same panels 1218 with the lighting feature 1212 activated.

V. Switches

Figure 28:
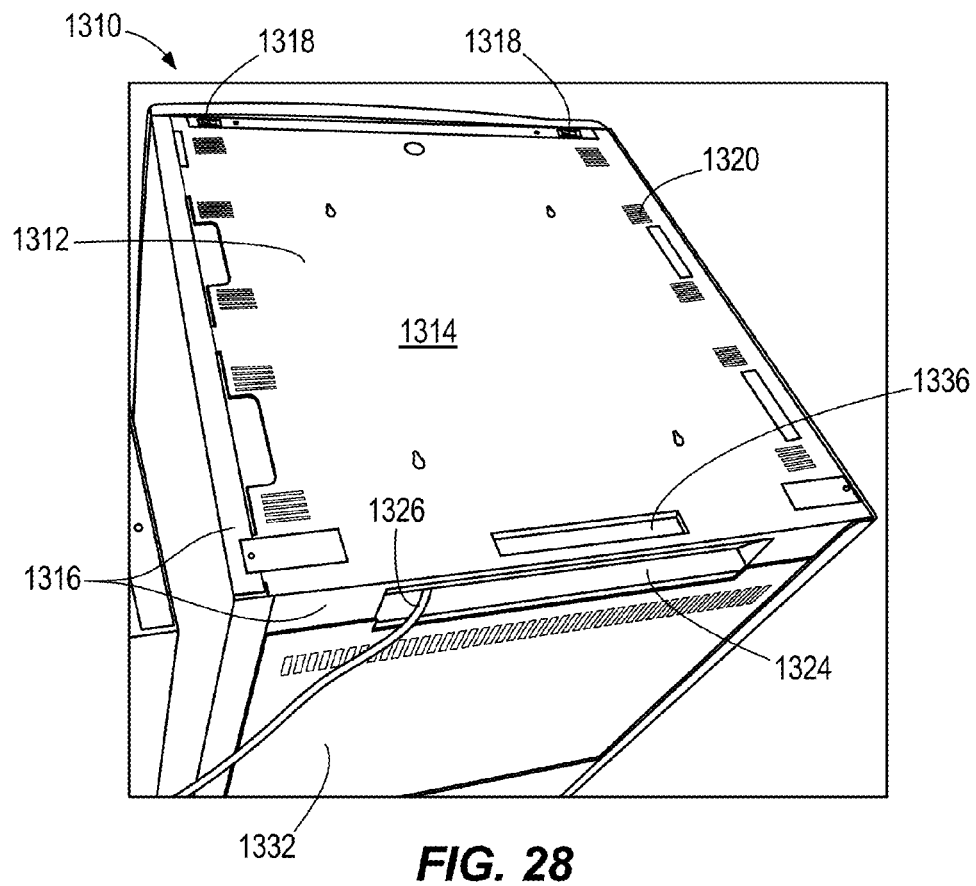
FIG. 28 is a perspective view of a top of a cabinet system in a first configuration according to an exemplary embodiment.

Referring to FIGS. 28-29, a top portion 1312 of a cabinet tower 1310 includes a panel 1314 fastened to a body 1316 of the tower 1310. Additionally the top 1312 includes one or more switches 1318, such as a master power switch, master light switch, UAC power switch, manual alarm, etc. According to an exemplary embodiment, the switch 1318 is position in a recessed portion 1322 of the top panel 1314, such that items stacked on the cabinet tower 1310 may be less likely to accidentally move the switch 1318. The panel 1314 further includes slots 1320 configured to support a V-shaped bracket (not shown) used to couple two towers together. Legs of the V-shaped bracket are inserted into the slots 1320 of each tower. A rear portion 1332 of the body 1316 includes a port 1324 through which a power cord 1326 and other communication cables may be coupled to the cabinet tower 1310 (see also FIG. 32). A slot 1336 on the top portion 1312 may be used to help tip or tilt the cabinet tower 1310, e.g. over a door threshold.

Figure 30:
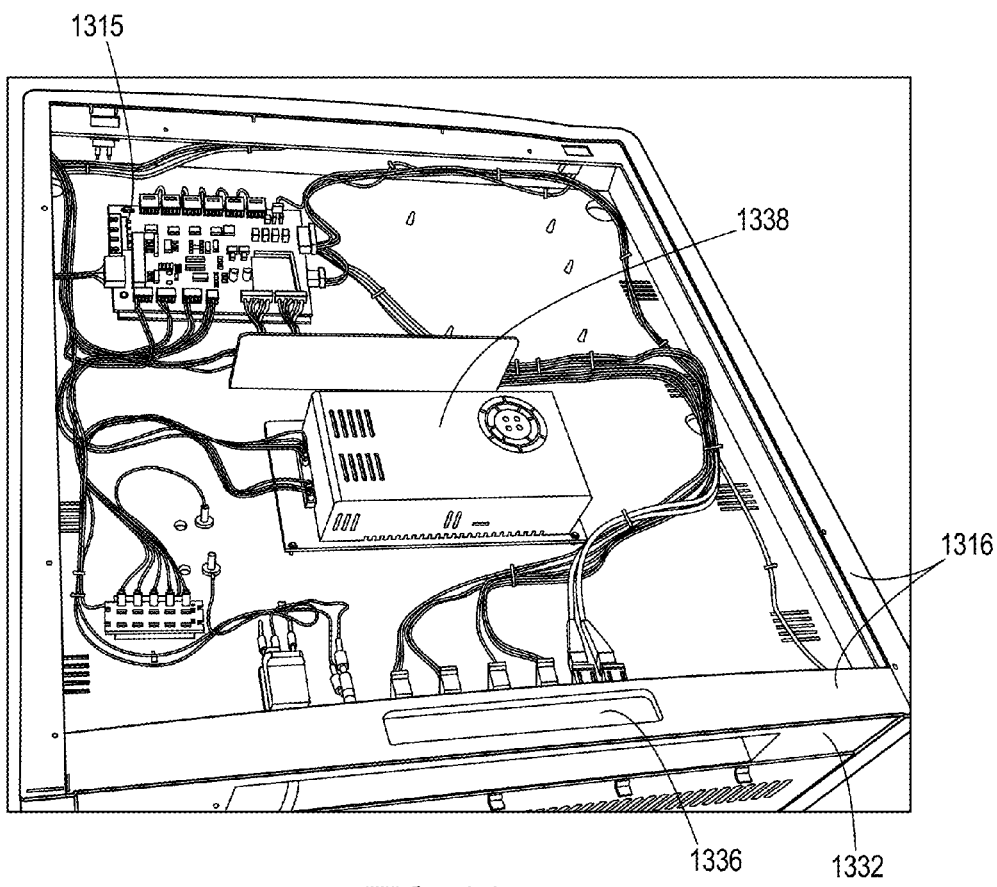
FIG. 30 is a perspective view of the top of the cabinet system of FIG. 28 in a second configuration.

Referring now to FIG. 30, the panel 1314 (FIG. 28) has been removed to show components of the top portion 1312 of the cabinet tower 1310, including a cabinet controller, shown as a mod bus controller 1314, and a power system 1338. In some embodiments, the components control lighting, fans, locks, sensors, and other electronic features of the cabinet tower 1310.

Figure 31:
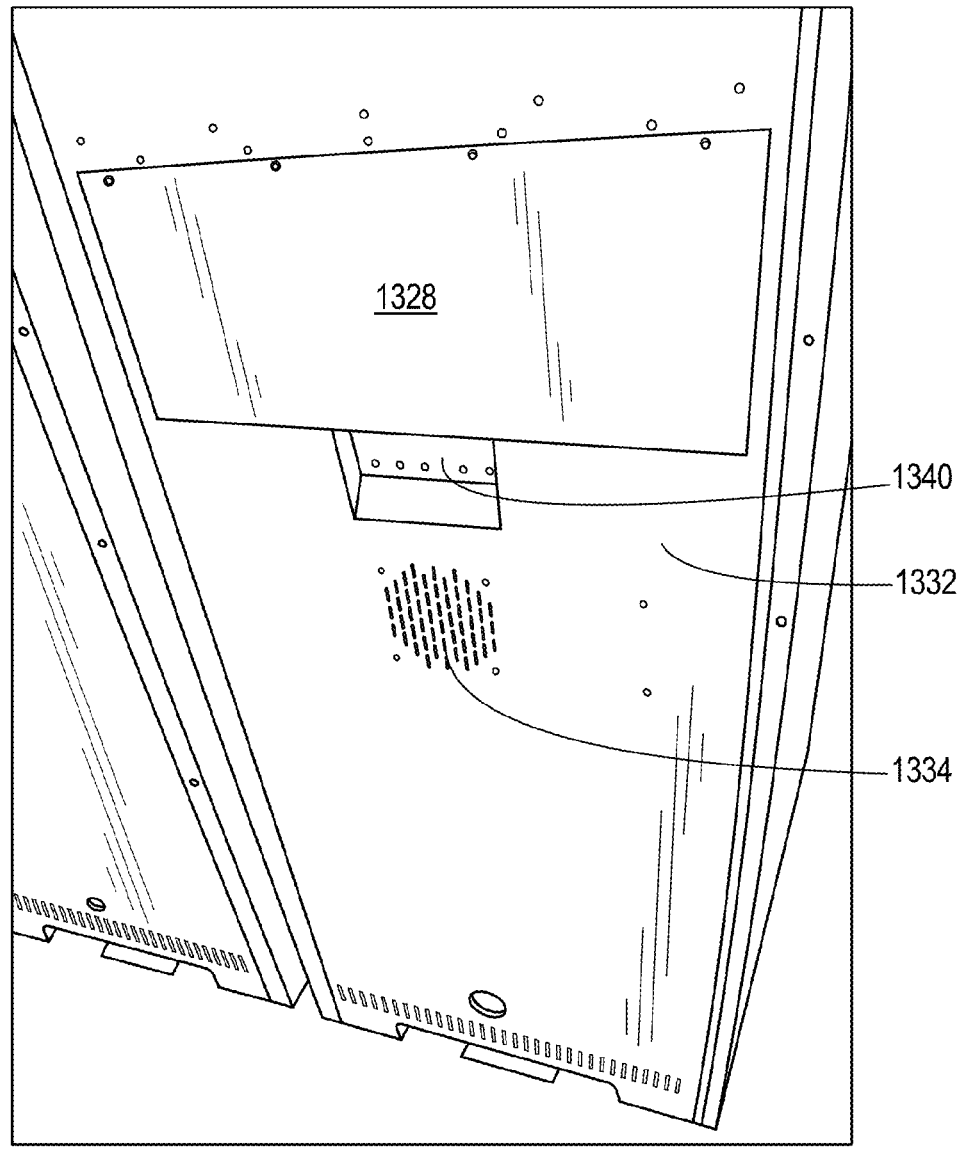
FIG. 31 is a perspective view of a rear of a cabinet system according to an exemplary embodiment.
Figure 32:
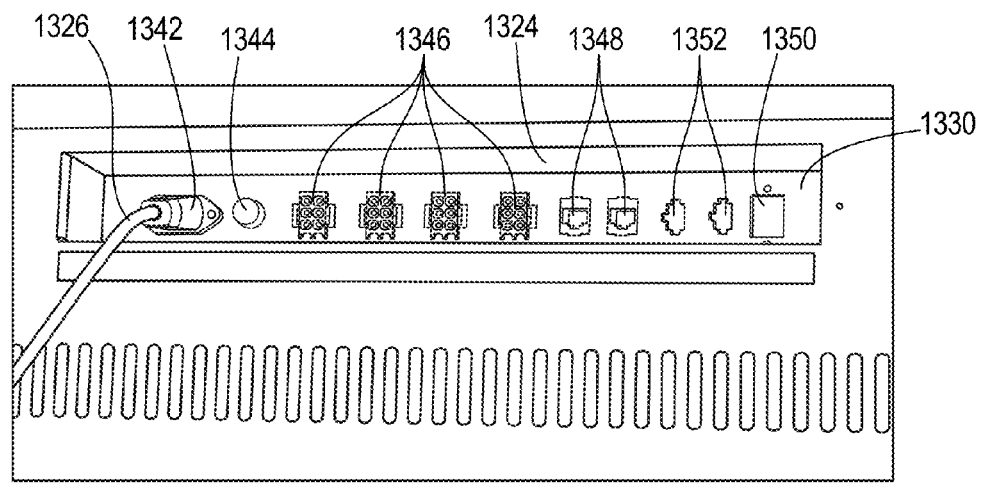
FIG. 32 is a perspective view of a first panel on the rear of a cabinet system of FIG. 31.
Figure 33:
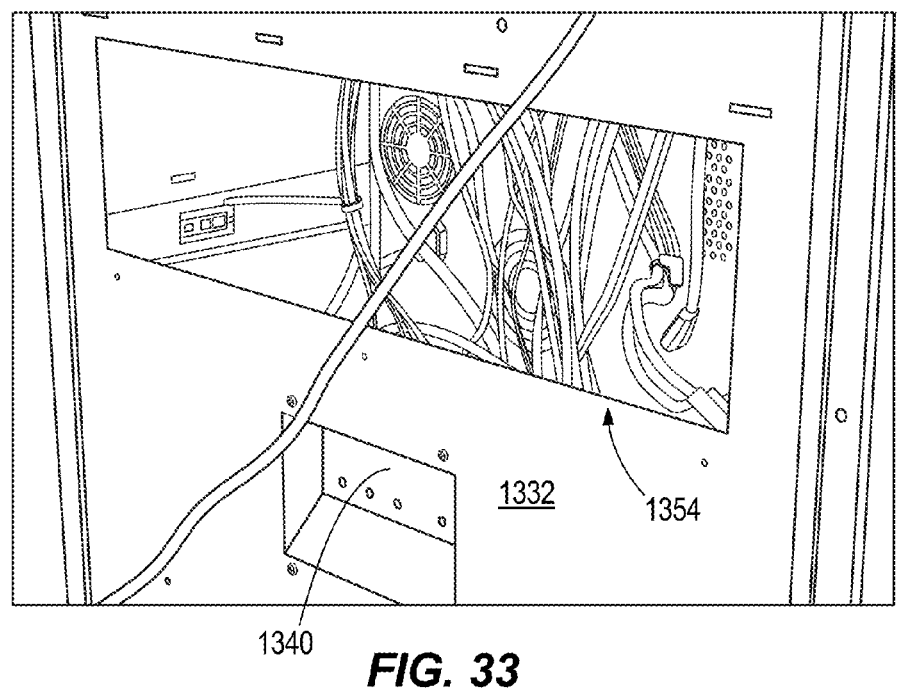
FIG. 33 is a perspective view of an access port in the rear of a cabinet system of FIG. 31.
Figure 34:
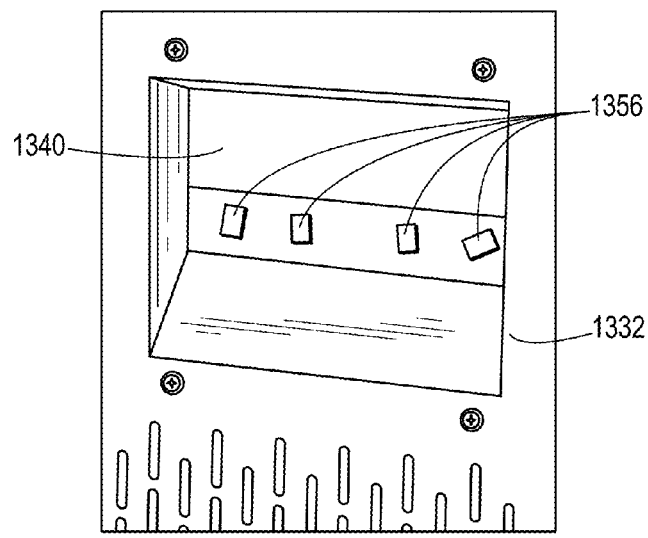
FIG. 34 is a perspective view of a second panel on the rear of a cabinet system of FIG. 31.

While FIG. 28 shows a top portion (e.g., port 1324) of a rear side 1332 of the cabinet tower 1310, FIG. 31 shows the rest of the rear side 1332. The rear side 1332 further includes a removable panel 1328, two communication panels 1330, 1340, and a fan vent 1334. FIG. 32 shows the communication panel 1330 (see also port 1324 and power cord 1326 as shown in FIG. 28). The communication panel 1330 includes a power connector 1342, a fuse 1344, four couplings 1346 to connect an external lock mechanism (e.g., electric lock) to an external controller, two ports 1348 for communications to other hardware, two interface bus ports 1352, and a universal serial bus (USB) port 1350. Referring to FIG. 33, access to internal components of the cabinet tower 1310 may be attained through the opening 1354 behind the panel 1328 (FIG. 31). Referring to FIG. 34, the second communication panel 1340 includes additional communication connectors 1356, such as for connection to a modem, a local area network, an uninterruptible power supply, a printer, and/or other items. In other embodiments, additional and/or different communication couplings may be included in the communication panels 1330, 1340.

VI. Shelf

Figure 35:
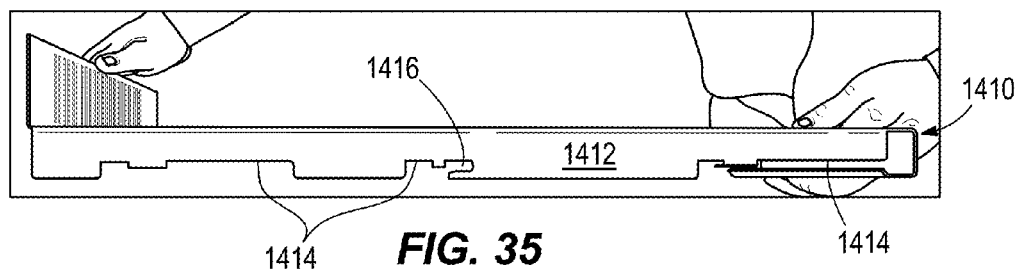
FIG. 35 is a side view of a shelf according to an exemplary embodiment.
Figure 36:
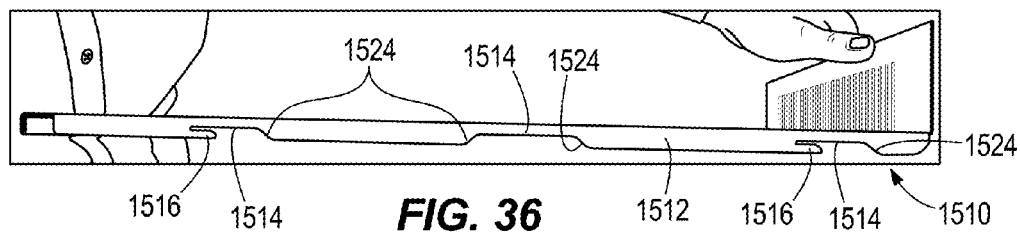
FIG. 36 is a side view of a shelf according to another exemplary embodiment.
Figure 37:
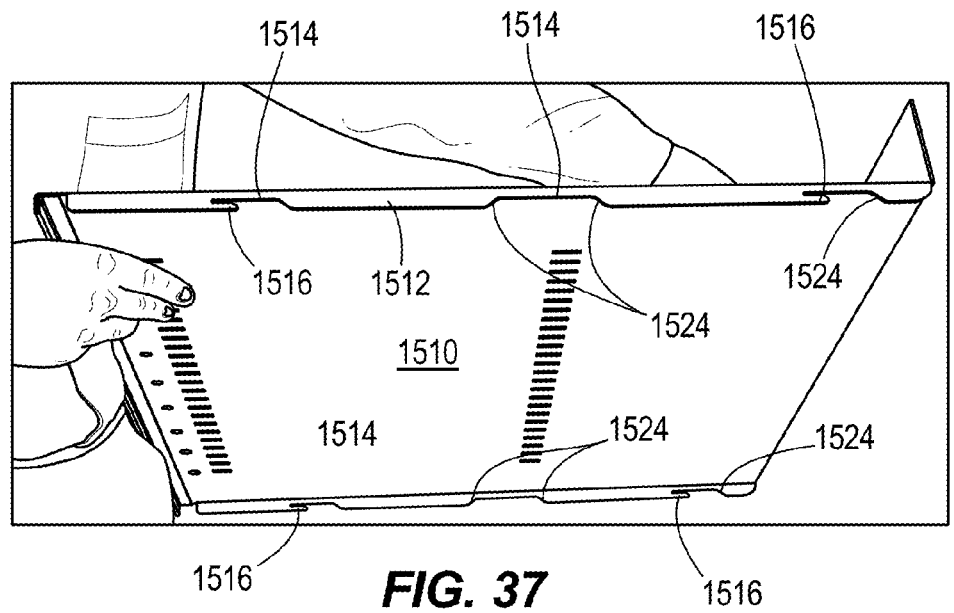
FIG. 37 is a perspective view of the shelf of FIG. 36.
Figure 38:
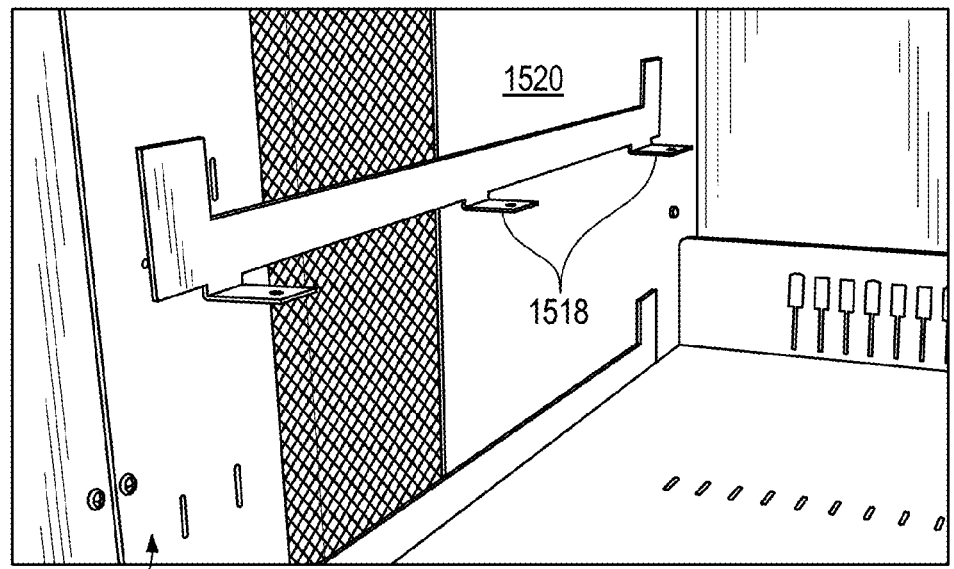
FIG. 38 is a perspective view of a shelf support according to an exemplary embodiment.
Figure 39:
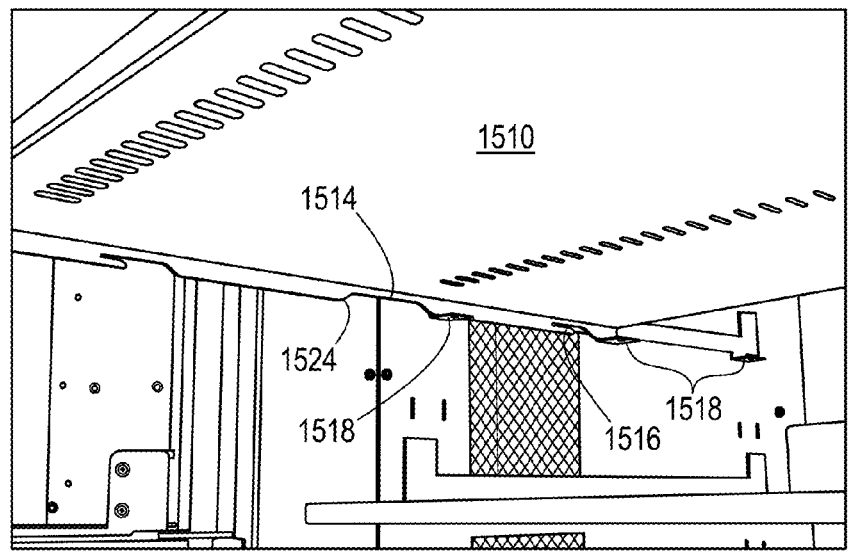
FIG. 39 is a perspective view of the shelf of FIG. 36 and the shelf support of FIG. 38 in a first configuration.

Referring to FIG. 35, a shelf 1410 includes a side wall 1412 having slots 1414 and catch portions 1416 therein for coupling the shelf 1410 to corresponding support structure (see, e.g., support structure 1518 as shown in FIG. 38) extending from sides of cabinet walls. The shelf 1410 may be slid over the support structure until the shelf 1410 is in a predetermined position along the cabinet walls, after which the support structure interlocks with the slots 1414 and catch portions 1416. As shown in FIG. 35, the slots 1414 and catch portions 1416 include right-angled curves with flat vertical and horizontal edges.

Referring now to FIGS. 36-41, a shelf 1510, according to another embodiment, includes a side wall 1512 having slots 1514 and catch portions 1516 therein. The slots 1514 and catch portions 1516 correspond to support structure 1518 (FIG. 38) extending from walls 1520 of a cabinet tower 1522, or other structure. The width of the shelf 1510 is narrower than the shelf 1410, allowing for greater storage space between shelves. During installation, the slots 1514 and catch portions 1516 of the shelf 1510 are configured to slide over the support structure 1518 when the shelf 1510 is being installed in the cabinet tower 1522.

Figure 40:
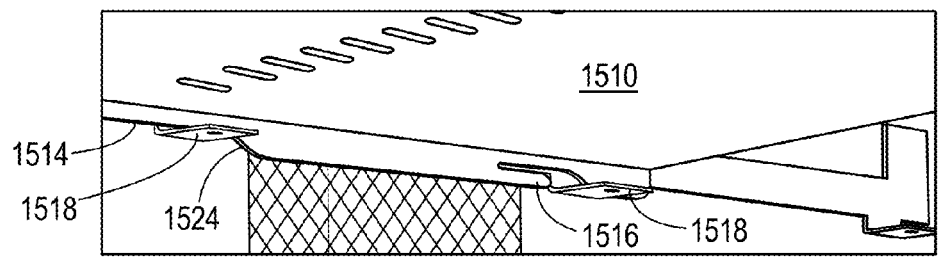
FIG. 40 is a perspective view of the shelf of FIG. 36 and the shelf support of FIG. 38 in a second configuration.
Figure 41:
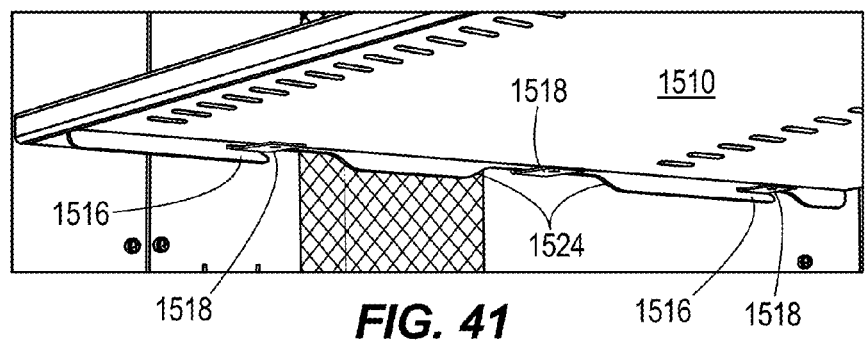
FIG. 41 is a perspective view of the shelf of FIG. 36 and the shelf support of FIG. 38 in a third configuration.

As shown in FIG. 40, one of the slots 1514 may engage an intermediate support structure 1518 without interlocking with the support structure 1518. Instead an operator may continue to push the shelf 1510 into the cabinet tower 1522, over angled inclines 1524 (e.g., angles other than 90 degrees; open space angle greater than 90 degrees). Additionally, the catch portions 1516 of the shelf 1510 are spaced apart so as to not be able to engage support structure 1518 other than the predetermined support structure 1518 to which the catch portions 1516 are designed to fasten when the shelf 1510 is fully installed within the cabinet tower 1522.

Figure 42:
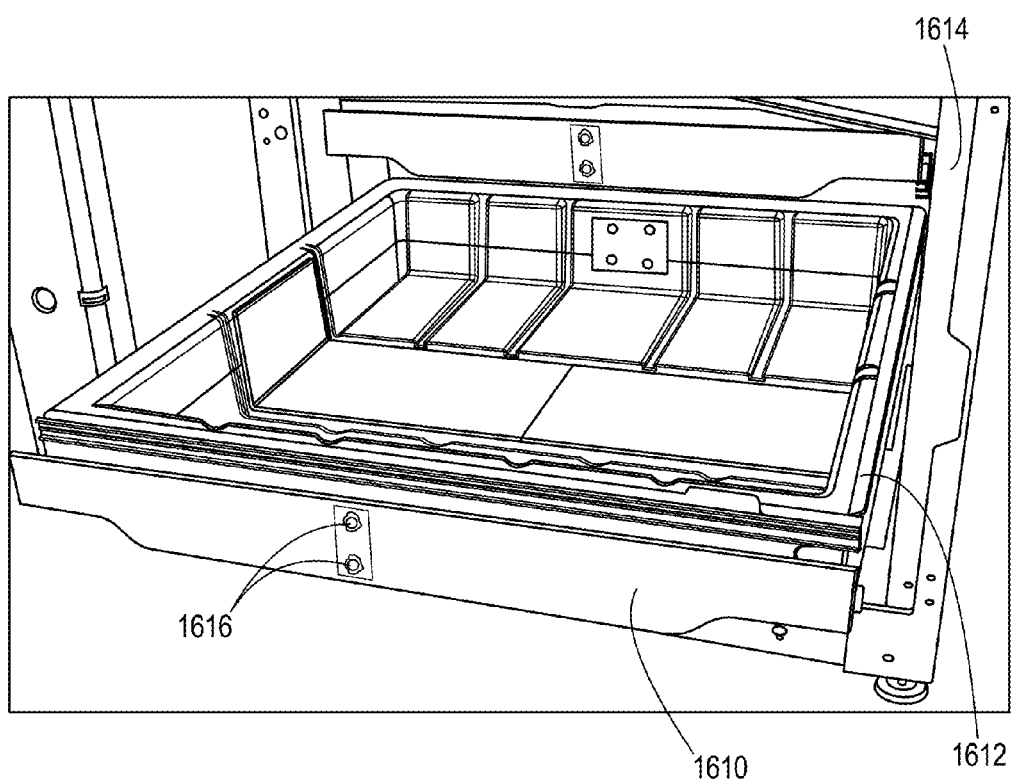
FIG. 42 is a perspective view of a drawer unit of a cabinet system according to an exemplary embodiment.

Referring to FIG. 42, a drawer 1610 (e.g., pull-out shelf) is configured to slide on rails 1612 within a portion of a cabinet tower 1614. In some embodiments, the drawer 1610 has dimensions and features other than those shown in FIG. 42 (e.g., deeper, shorter, taller). In some embodiments, the drawer 1610 may include a lock 1616 (e.g., electric lock, manual key lock).

VII. Divider

Figure 43:
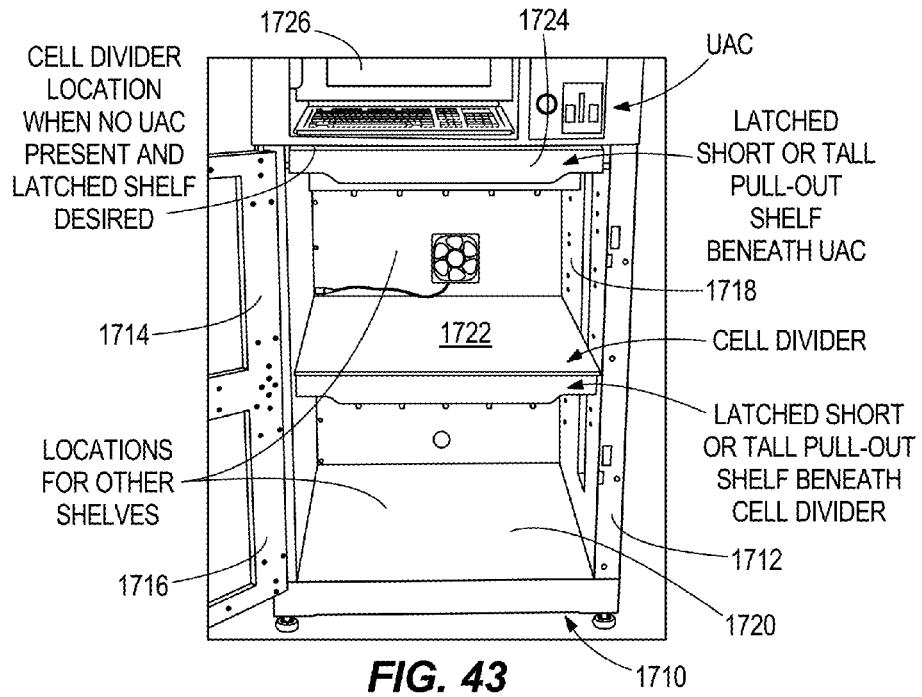
FIG. 43 is shelving of a lower portion of a cabinet system according to an exemplary embodiment.

Referring to FIG. 43, a lower portion 1712 of a cabinet tower 1710 includes two doors 1714, 1716 releasably joined together to optionally function as a single door (see, e.g., bracket 1118 as shown in FIG. 21). The doors 1714, 1716 open and close two compartments 1718, 1720 divided by a cell divider 1722 (e.g., divider). According to an exemplary embodiment, the cell divider 1722 is configured to block access to the lower compartment 1720, if the door 1714 to the upper compartment 1718 is open and the door 1716 to the lower compartment 1720 is closed, and visa versa. Additionally, the cell divider 1722 is configured to limit heat transfer between compartments 1718, 1720 (i.e., through the divider 1722). Heat flow is directed outside of the cabinet tower 1710 via vents, or through walls of the cabinet tower 1710. The cabinet tower 1710 in FIG. 43 further includes a drawer 1724 behind the door 1714, and a user interface 1726.

Figure 44:
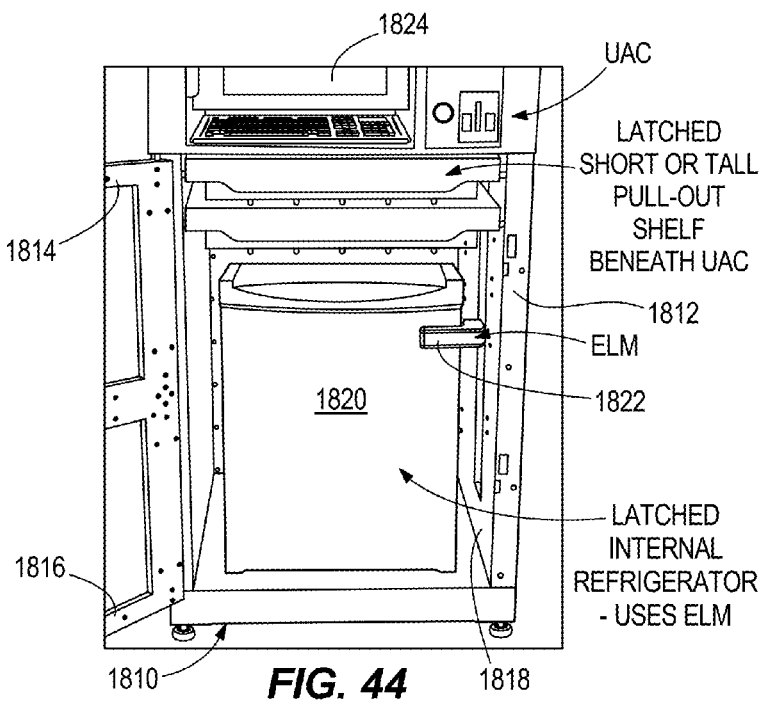
FIG. 44 is a refrigerator of a lower portion of a cabinet system according to another exemplary embodiment.

Referring to FIG. 44, a lower portion 1812 of a cabinet tower 1810 includes two doors 1814, 1816 joined together to function as a single door. The doors 1814, 1816 open and close a single compartment 1818 configured to support a refrigerator 1820 therein. The refrigerator 1820 may be used to store and/or preserve medicaments, such as oncology supplies. In some embodiments, the refrigerator 1820 includes an external locking mechanism 1822, which may be locked and unlocked by an external controller (e.g., a user interface 1824, a remote computer, etc.), such as through connectors (see, e.g., couplings 1346 as shown in FIG. 32) coupled to the cabinet tower 1810. In such embodiments, a cell divider 1826 may be positioned within the cabinet tower 1810, above the refrigerator 1820 to thermally and physically separate the refrigerator 1820 from the user interface 1824, or other portions of the cabinet tower 1810.

Figure 45:
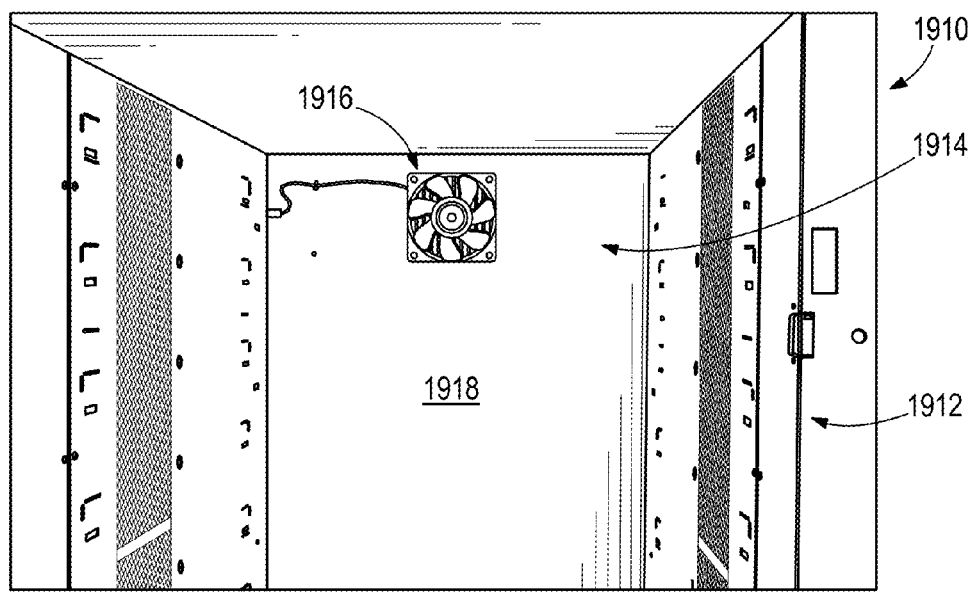
FIG. 45 is an upper portion of the lower portion of the cabinet system of FIG. 23.
Figure 46:
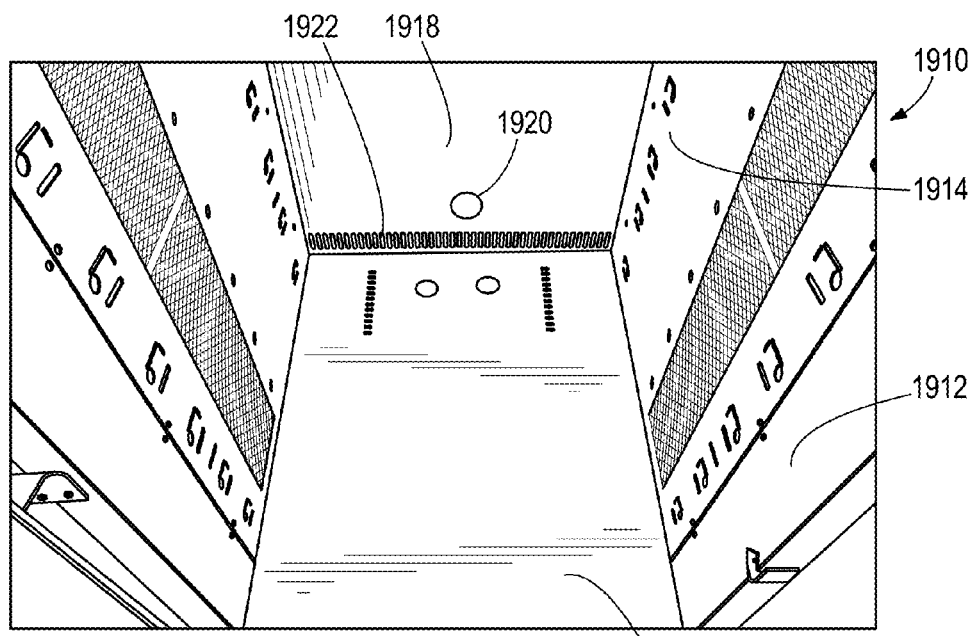
FIG. 46 is a lower portion of the lower portion of the cabinet system of FIG. 23.
Figure 47:
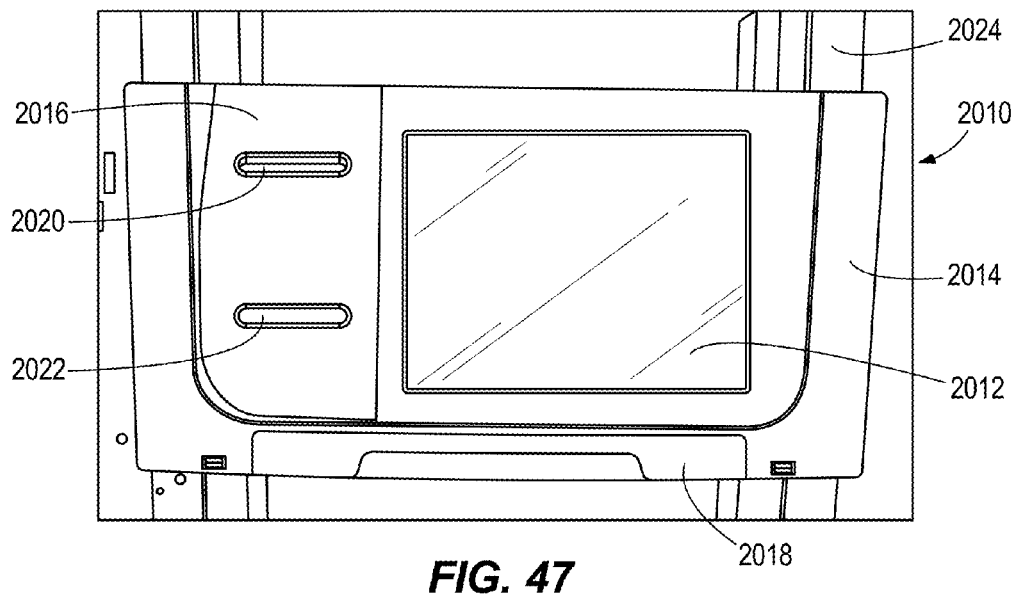
FIG. 47 is a front perspective view of a user interface in a first configuration according to an exemplary embodiment.
Figure 48:
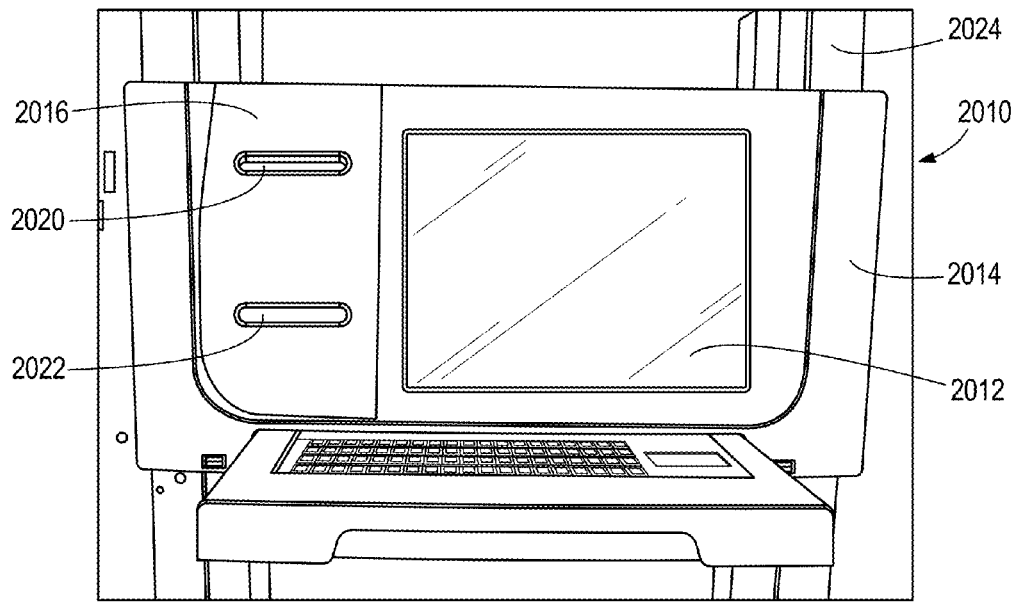
FIG. 48 is a front perspective view of the user interface of FIG. 47 in a second configuration.
Figure 49:
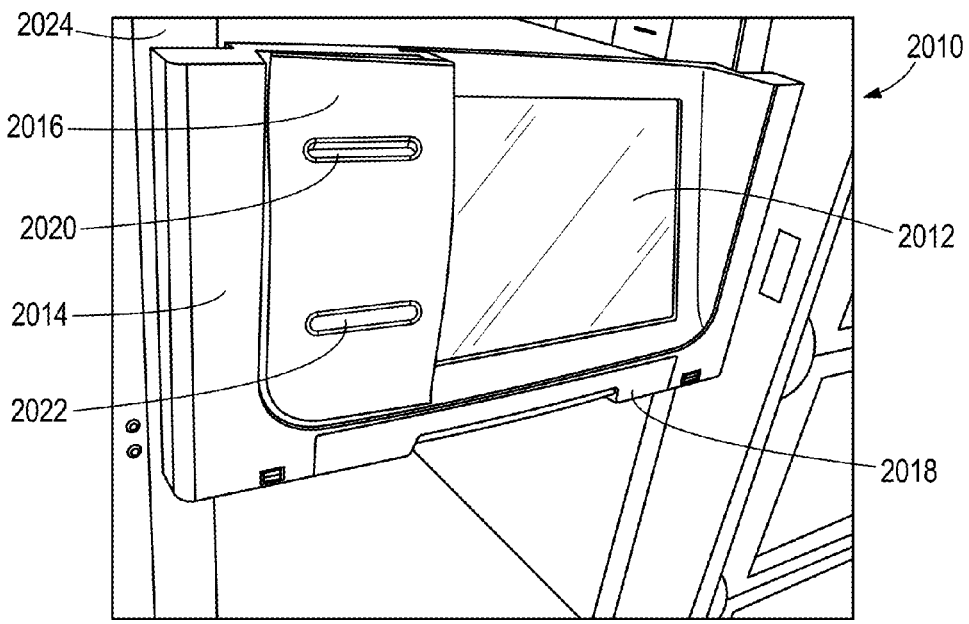
FIG. 49 is a left side perspective view of the user interface of FIG. 47 in a first configuration.
Figure 50:
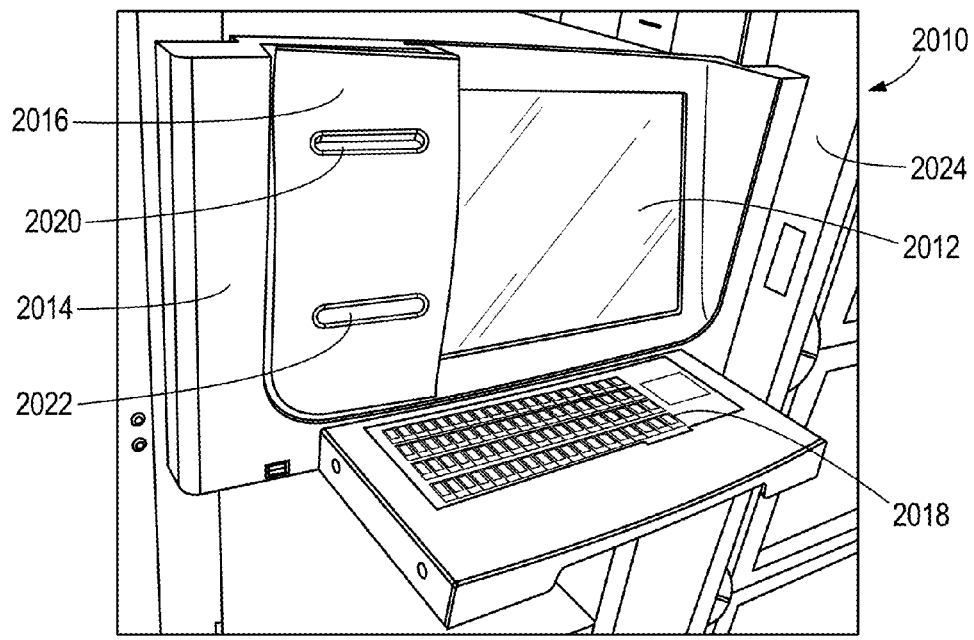
FIG. 50 is a left side perspective view of the user interface of FIG. 47 in a second configuration.
Figure 51:
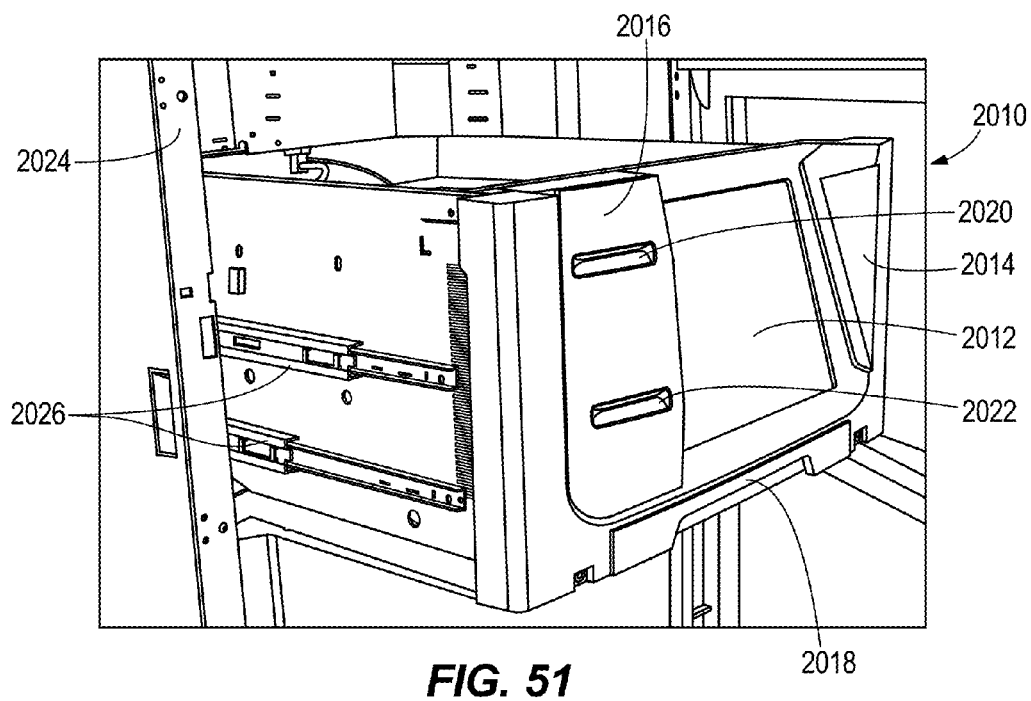
FIG. 51 is a left side perspective view of the user interface of FIG. 47 in a third configuration.
Figure 52:
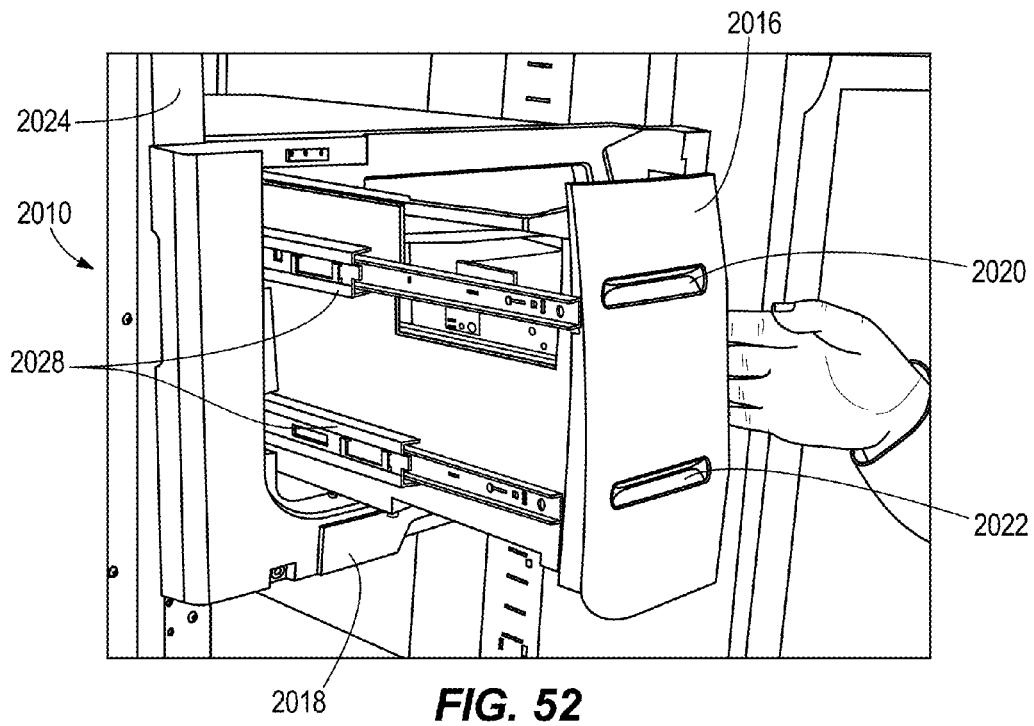
FIG. 52 is a left side perspective view of the user interface of FIG. 47 in a fourth configuration.

Referring now to FIGS. 45-46, a lower portion 1912 of a cabinet tower 1910 includes a compartment 1914. The compartment 1914 is configured to hold a refrigerator (see, e.g., FIG. 44), shelving (see, e.g., FIG. 43), or other items therein. As shown in FIG. 45, in some embodiments the lower portion 1912 includes a fan 1916 coupled to a back wall 1918 thereof. The fan 1916 is configured to circulate air through the compartment 1914, such as to cool the refrigerator. As shown in FIG. 46, in some embodiments, the lower portion 1912 includes an opening 1920 through which a power cord may be routed to the refrigerator, or other items. In another embodiment, cabinet tower 1910 includes an internal power supply system or internal power bus, e.g. a 120 volt AC outlet mounted in a compartment 1914. Slots 1922 on the floor 1924 of the lower portion 1912 allow for brackets (not shown) to be inserted therein to limit rearward and/or lateral sliding of the refrigerator.

VIII. User Interface

Referring to FIGS. 47-50, a user interface 2010 includes a monitor 2012, a frame 2014 (e.g., housing, support structure, etc.), a printer portion 2016, and a keyboard 2018. The printer portion 2016 includes two output slots 2020, 2022, and according to an exemplary embodiment, one slot 2020 is for printed labels, the other slot 2022 is for printed receipts. Other embodiments include more or fewer printer slots. The keyboard 2018 may be slid into (FIGS. 47, 49) and out of (FIGS. 48, 50) the frame 2014. In some embodiments, the user interface 2010 may be coupled to a cabinet tower 2024 at any location on the cabinet tower 2024, or may be coupled to other structures.

Figure 53:
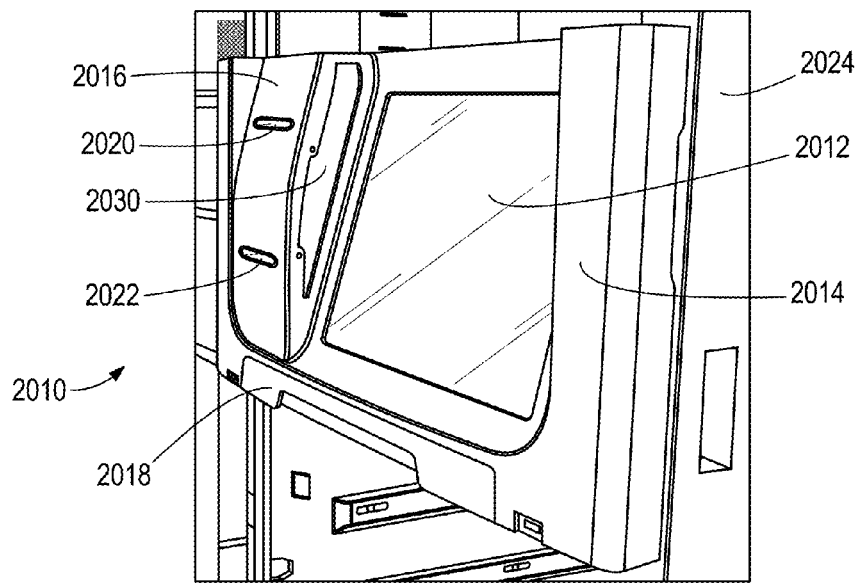
FIG. 53 is a right side perspective view of the user interface of FIG. 47.
Figure 54:
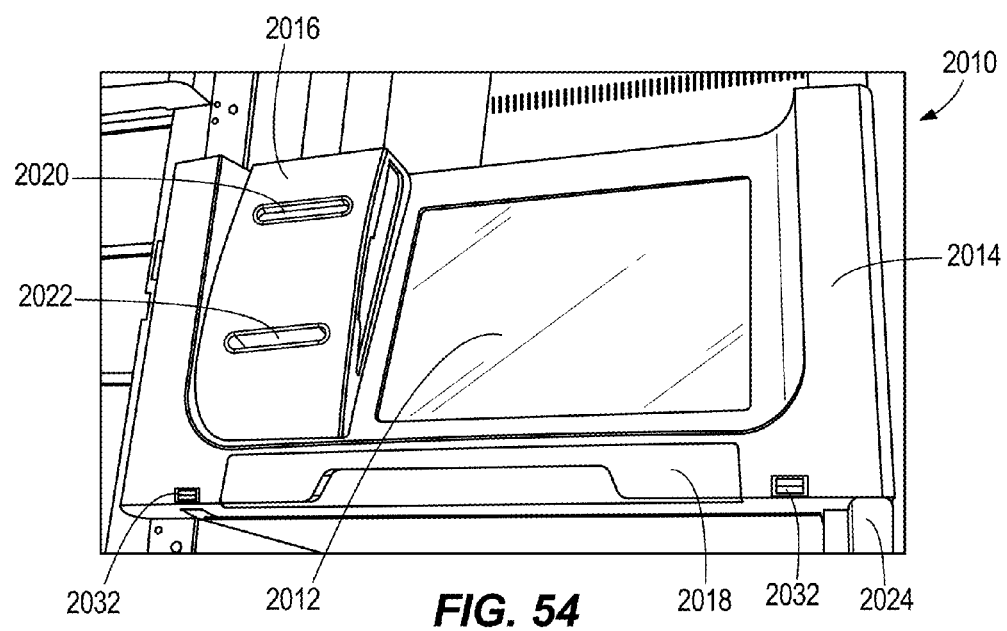
FIG. 54 is a bottom perspective view of the user interface of FIG. 47.

Referring now to FIGS. 51-54, according to an exemplary embodiment, the user interface 2010 maybe slid within the cabinet tower 2024 on rails 2026 (e.g., tracks, slides, etc.). Additionally, the printer portion 2016 maybe slid relative to the frame 2014 on rails 2028. Sliding of the user interface 2010 from the cabinet tower 2024 and the printer portion 2016 from the frame 2014 may allow for item (e.g., printing material, circuitry, etc.) replacement, maintenance, upgrade, refill, etc. Referring to FIG. 53, according to an exemplary embodiment, the user interface 2010 additionally includes a handle 2030 for pulling the printer portion 2016 relative to the frame 2014. Referring to FIG. 54, USB ports 2032 are coupled to the frame 2014.

Figure 55:
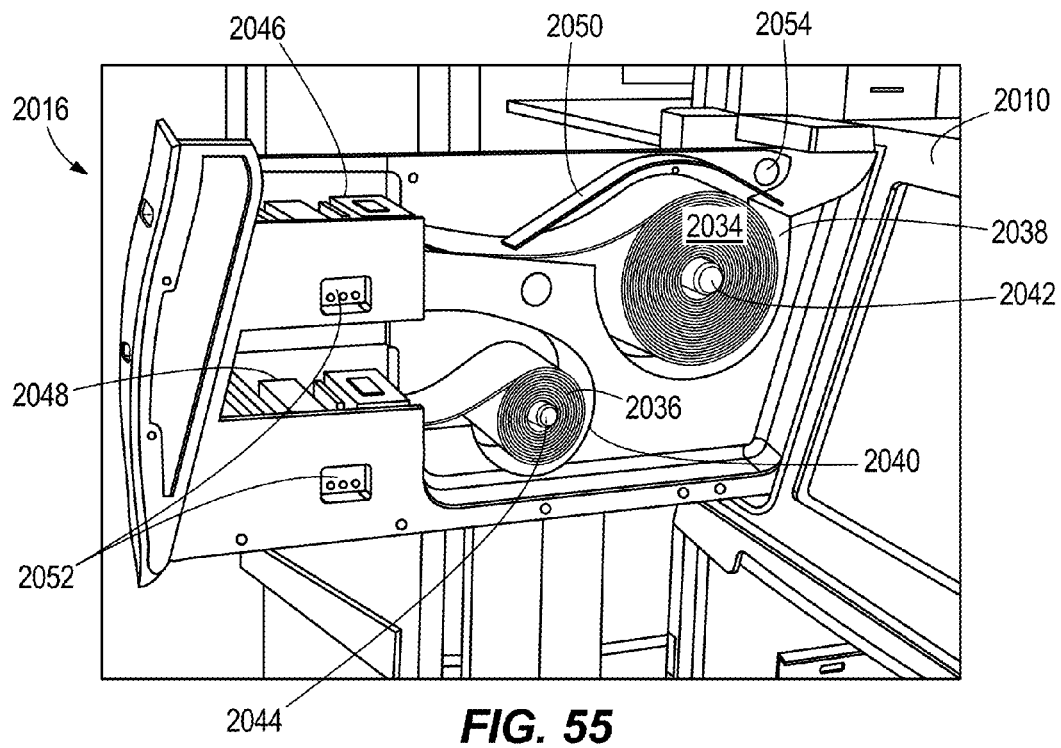
FIG. 55 is a perspective view of printers and printing material of the user interface of FIG. 47.
Figure 56:
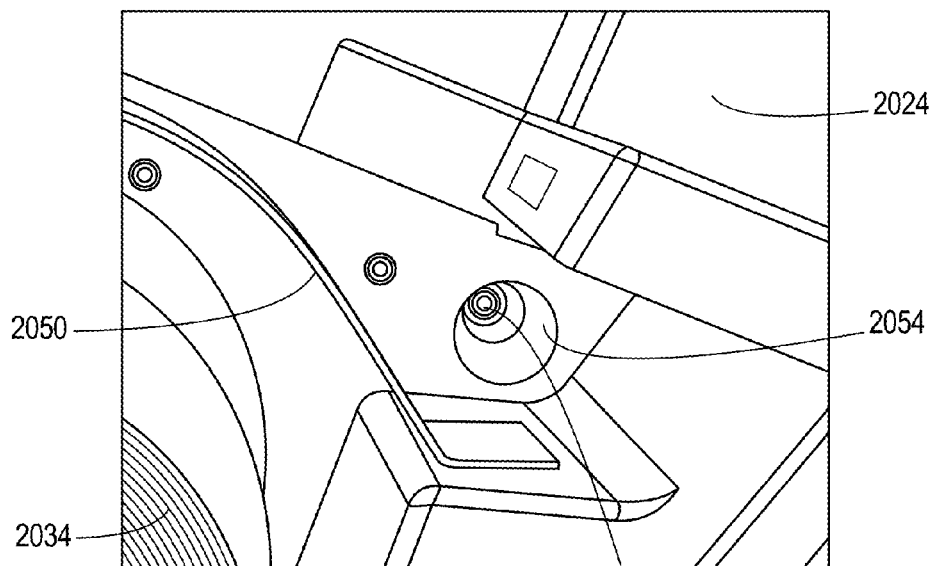
FIG. 56 is a perspective view of an lock access port of the user interface of FIG. 47.
Figure 57:
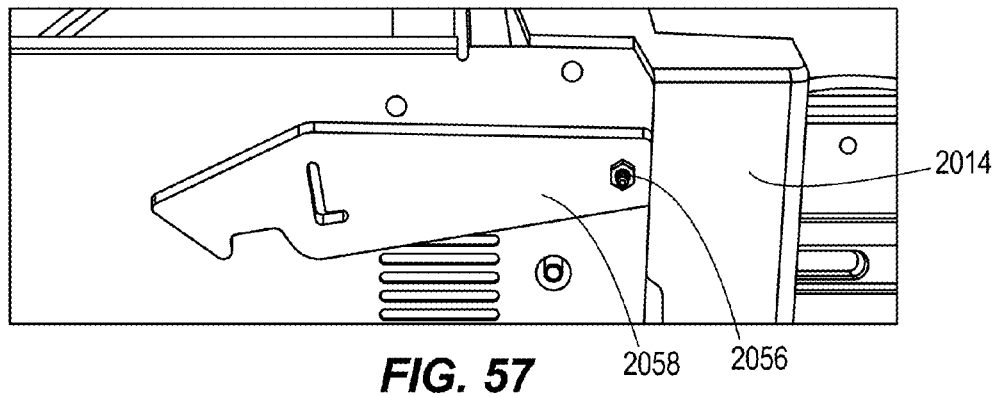
FIG. 57 is a side view of a latch of the lock of the user interface of FIG. 47 in a first configuration according to an exemplary embodiment.
Figure 58:
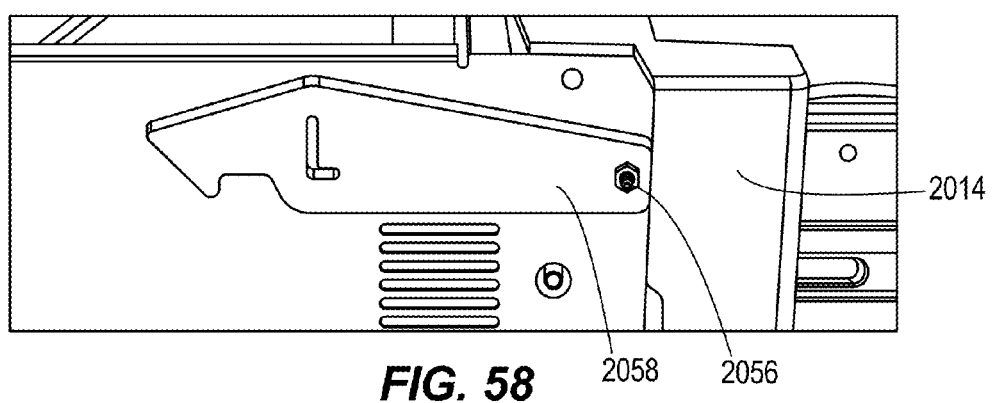
FIG. 58 is a side view of a latch of the lock of the user interface of FIG. 47 in a second configuration.
Figure 59:
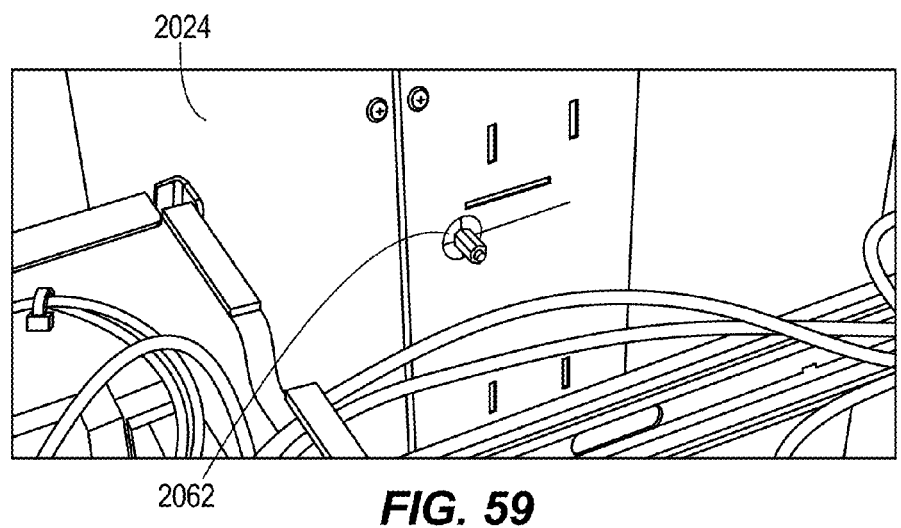
FIG. 59 is a perspective view of a catch of the lock of the user interface of FIG. 47 according to an exemplary embodiment.

Referring now to FIG. 55, the printer portion 2016 of the user interface 2010 includes spools 2042, 2044 in recessed portions 2038, 2040 to support materials 2034, 2036 for printing labels, receipts, etc. thereon. The printer portion 2016 includes two printers 2046, 2048 and a tensioning member 2050 coupled to the materials 2042 to maintain tension therein. Indicator lights 2052 provide information regarding the printers (e.g., print, power, status). The printer portion 2016 additionally includes an access port 2054 to a locking mechanism (see FIGS. 56-60) to lock the user interface 2010 within the cabinet tower 2024.

Figure 60:
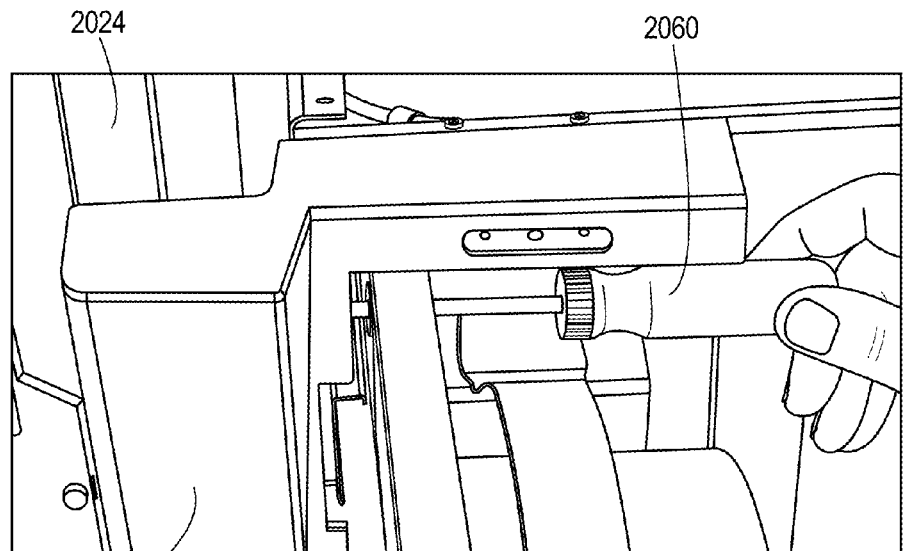
FIG. 60 is a perspective view of an operator releasing the lock of the user interface of FIG. 47.

Referring now to FIGS. 56-60, through the access port 2054, a pivot 2056 (e.g., point of rotation, pin, etc.) for a latch 2058 may be accessed by a shafted tool 2060 (FIG. 60). Pivot 2056 may include a tamper-resistant screw head requiring a secure or proprietary shafted tool 2060 compatible with pivot 2056, thereby limiting operation of latch 2058 and access to user interface 2010 to qualified service personnel. With the printer portion 2016 slid out relative to the frame 2014, a user may insert the tool 2060 into the access port 2054. Rotation of the pivot 2056 by the tool 2060 (compare FIG. 57 to FIG. 58) lifts the latch 2058 relative to a knob 2062 (e.g., extension, catch, etc.) (FIG. 59) coupled to the cabinet tower 2024. Gravity and/or a biasing member returns the latch 2058 to the locking position, such as when the user interface 2010 is fully pushed into the cabinet tower 2024. In other embodiments, a solenoid or other actuator may be used to control the latch 2058.

Figure 62:
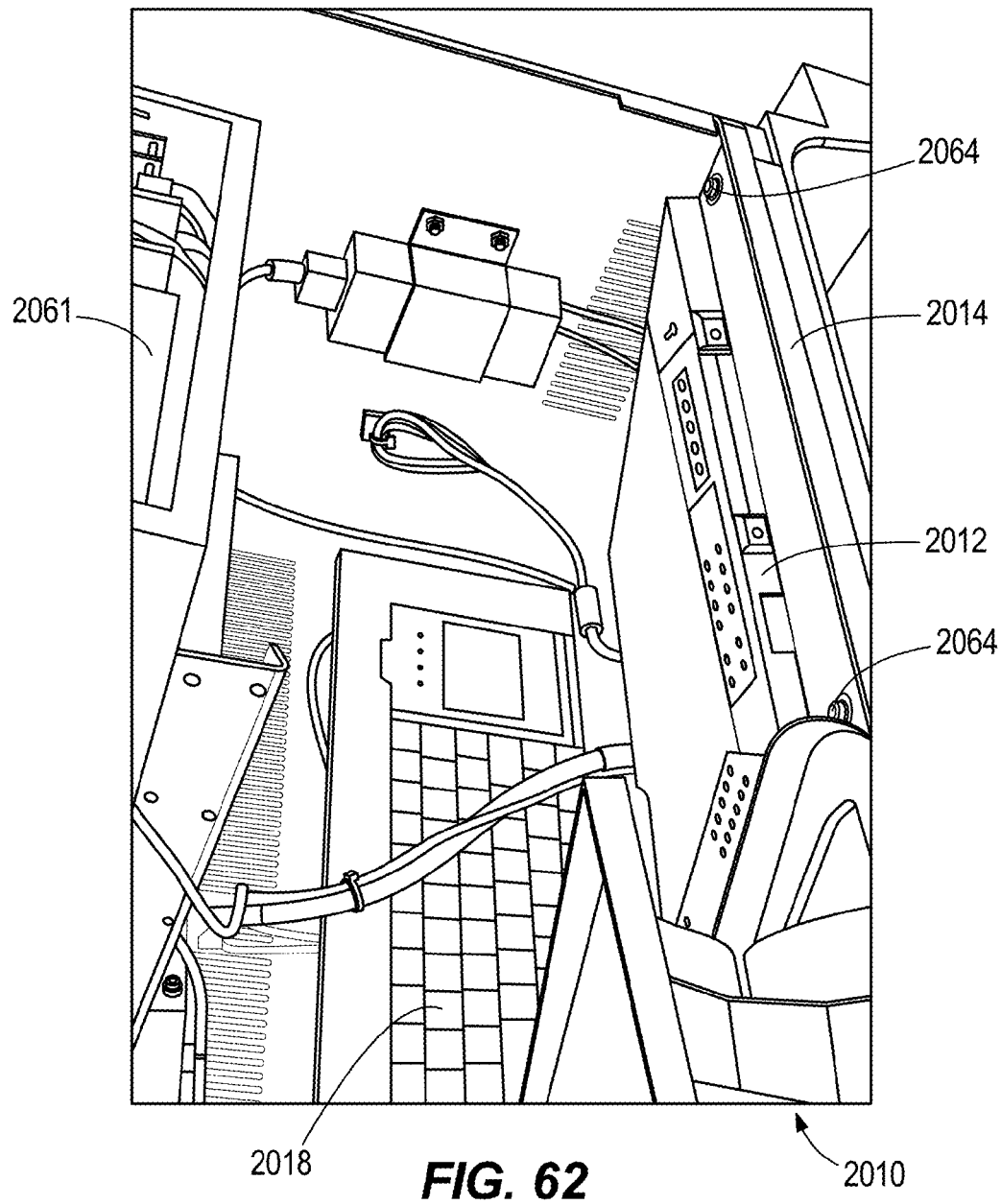
FIG. 62 is a second perspective view of internal components of the user interface of FIG. 47.
Figure 63:
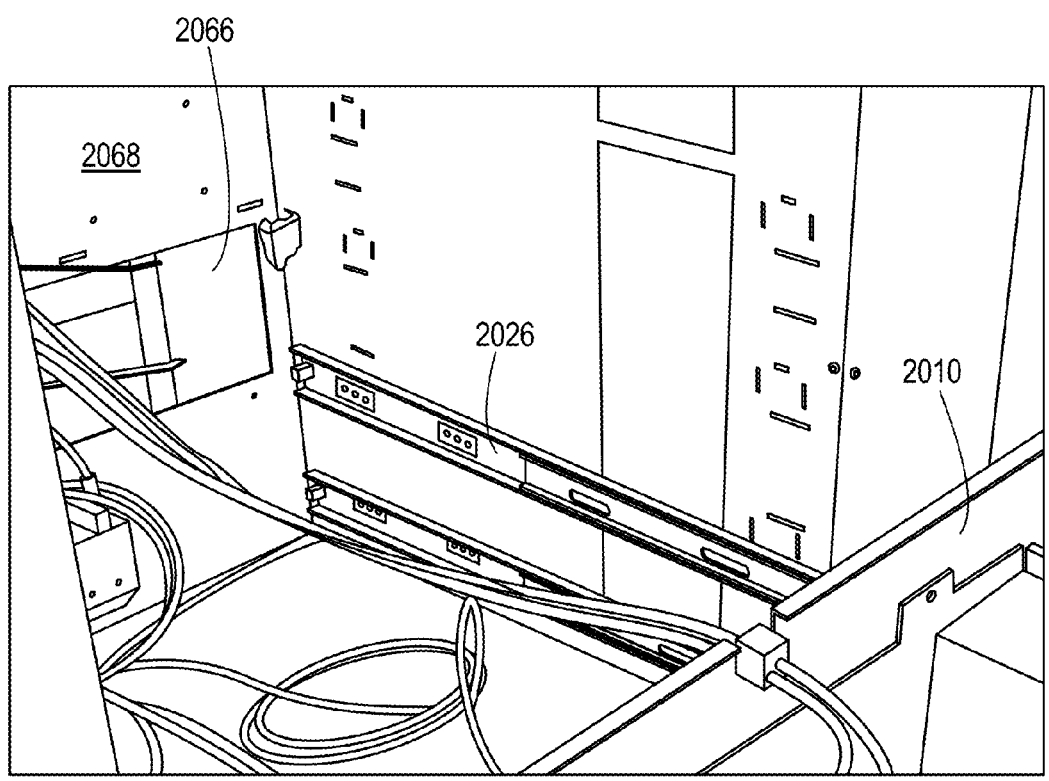
FIG. 63 is a perspective view of an inside of the cabinet system according to an exemplary embodiment.

Referring to FIGS. 61-63, internal components of the user interface 2010 include a processor 2061 (and/or other components) and support structure 2063 therefor. The support structure 2063 separates the processor 2061 from the remainder of the internal components, allowing for quick and simple installation and removal of the processor 2061. The monitor 2012 (see FIG. 62) may be removed by releasing two fasteners 2064, rotating the monitor 2012 backward, and lifting the monitor 2012 out of the frame 2014. As shown in FIG. 63, wiring for the user interface 2010 is controllably directed to an access port 2066 (see also FIG. 31) on a rear side 2068 of the cabinet tower 2024.

Figure 64:
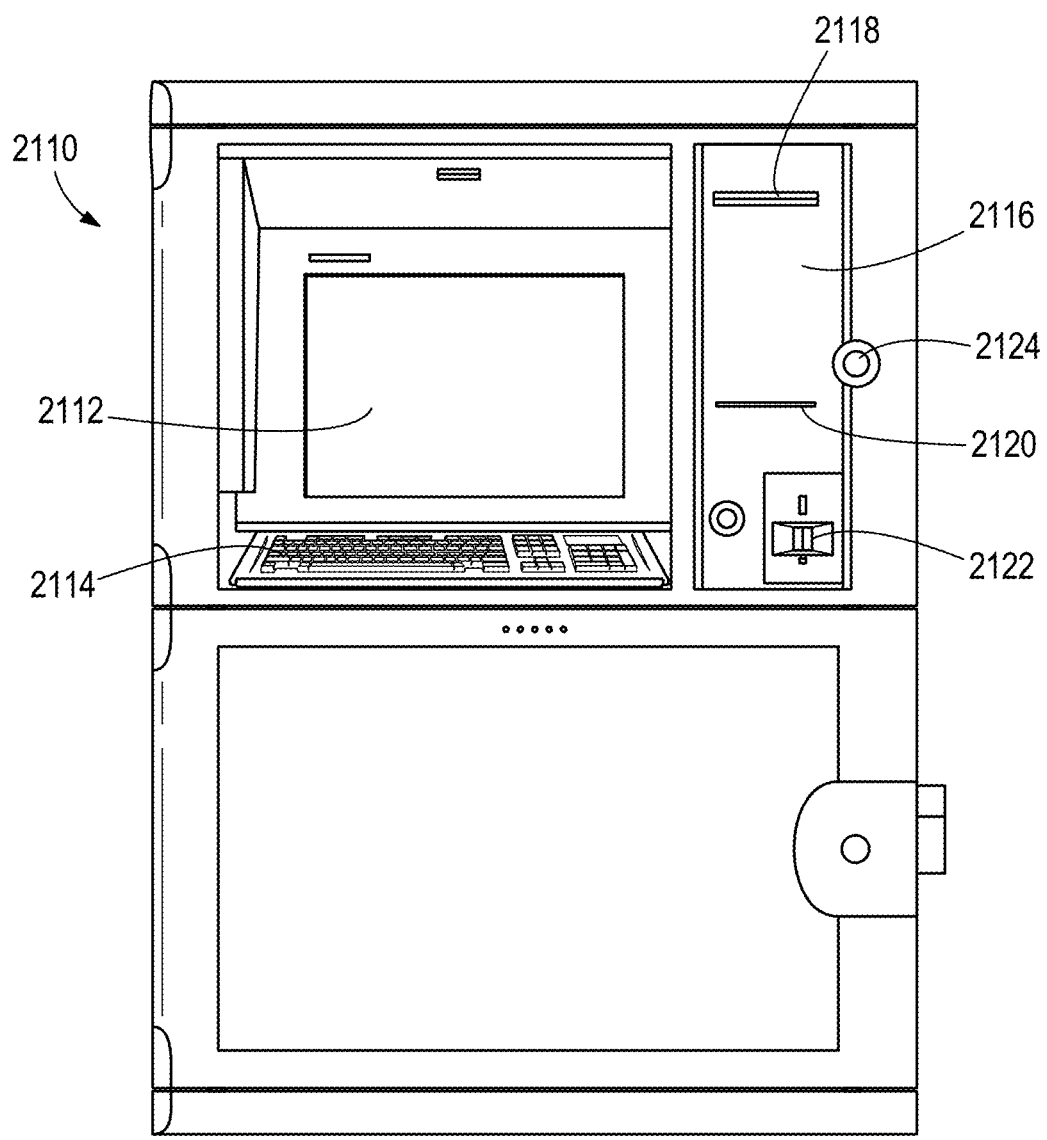
FIG. 64 is a front view of a user interface according to another exemplary embodiment.
Figure 65:
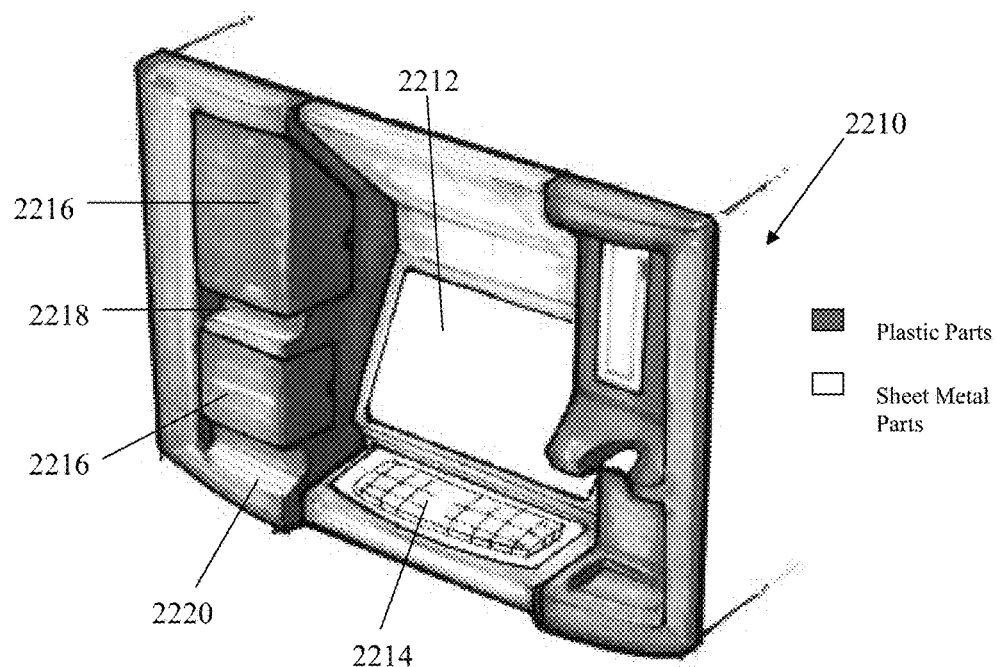
FIG. 65 is a perspective view of a user interface according to yet another exemplary embodiment.
Figure 66:
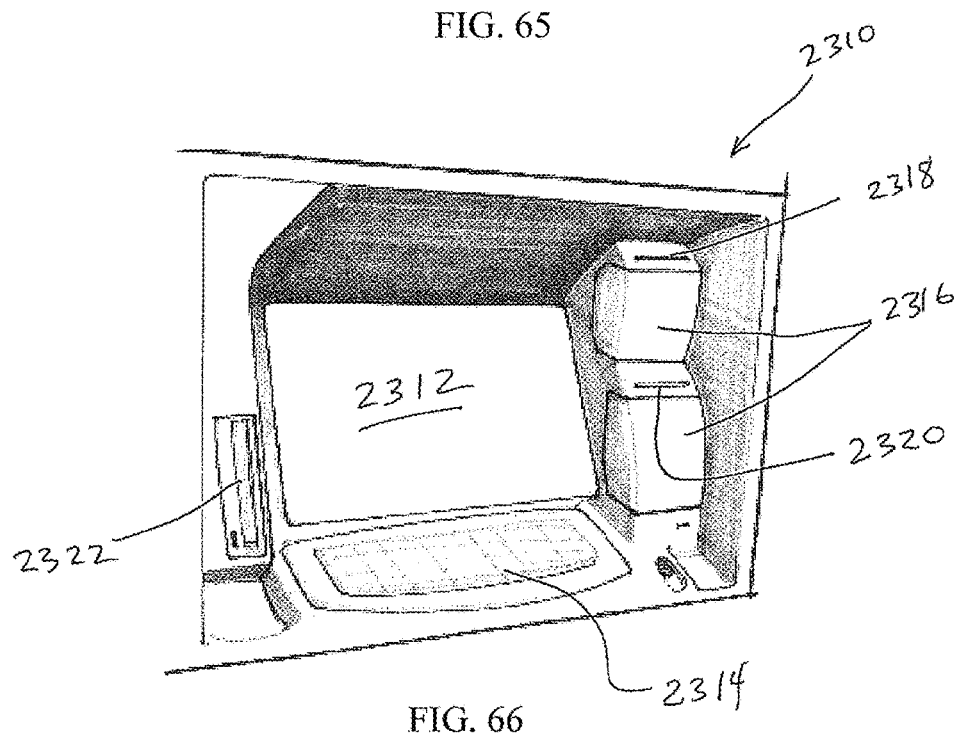
FIG. 66 is a perspective view of a user interface according to still another exemplary embodiment.

Referring now to FIGS. 64-66, three user interfaces 2110, 2210, 2310 are shown according to alternative exemplary embodiments. The user interfaces 2110, 2210, 2310 include monitors 2112, 2212, 2312, keyboards 2114, 2214, 2314, and printer portions 2116, 2216, 2316, and slots 2118, 2120, 2218, 2220, 2318, 2320 therefor, respectively. According to exemplary embodiments, the user interfaces 2110, 2210, 2310 are configured to be coupled to supply cabinet towers or other structures. The user interface 2110 includes an identification card slot 2122 for user verification, and a key hole 2124 to release the printer portion 2116. The user interface 2310 includes a disk drive 2322.

Figure 67:
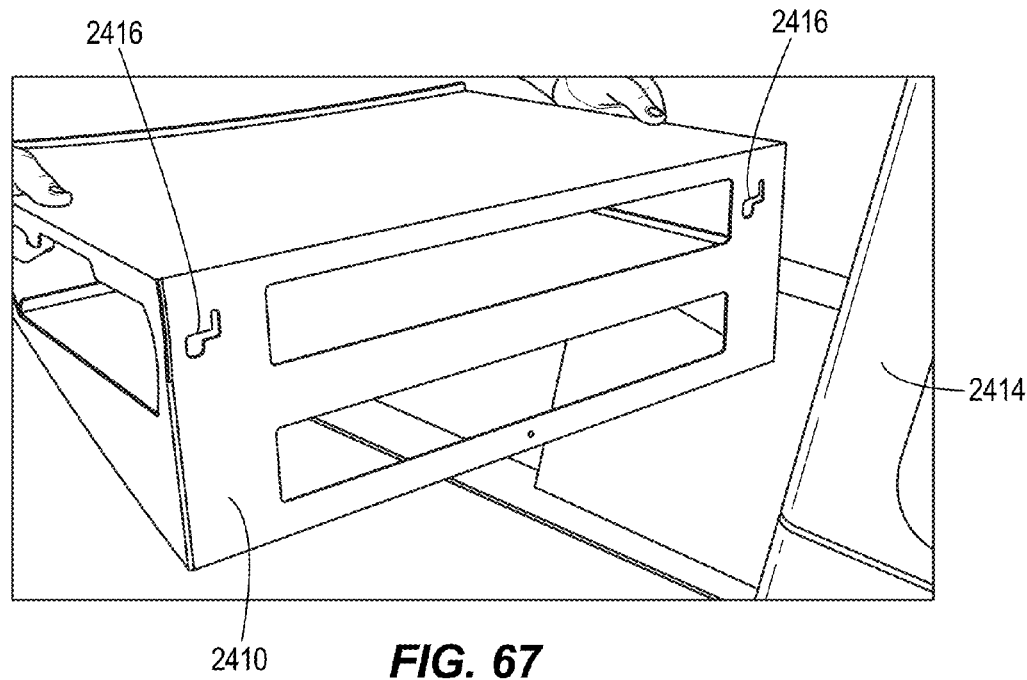
FIG. 67 is a perspective view of an external shelf in a first configuration according to an exemplary embodiment.
Figure 68:
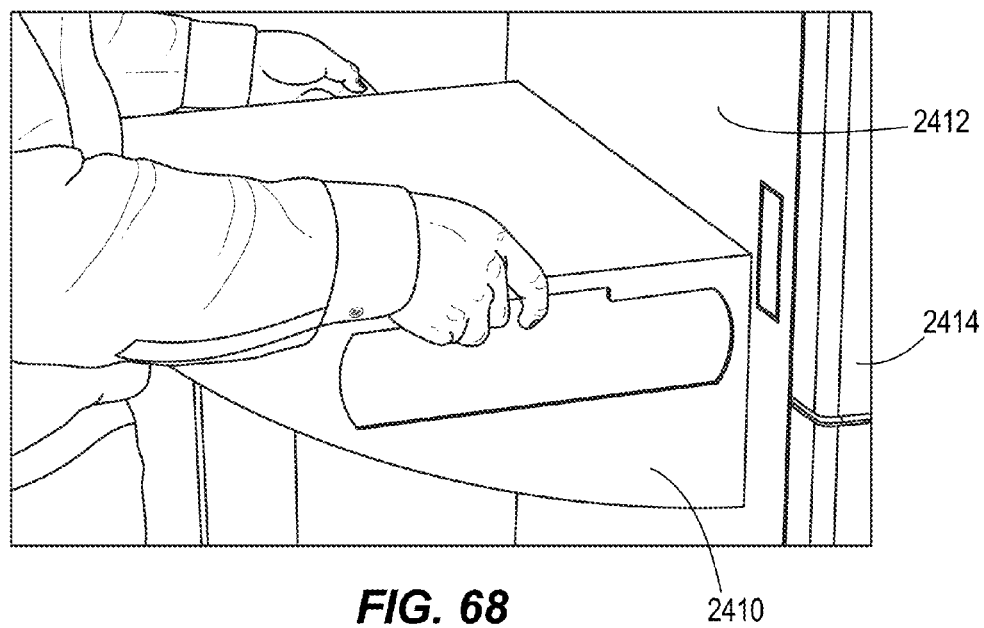
FIG. 68 is a perspective view of the external shelf in FIG. 67 in a second configuration.

Referring to FIGS. 67-68, a shelf 2410 (e.g., external shelf) may be coupled to an outside wall 2412 of a cabinet tower 2414. The shelf 2410 may include an aperture 2416 for releasably coupling the shelf to flanges (e.g., bolt heads) extending from the outside wall 2412. Curvature of the aperture 2416 maybe configured to releasably lock the shelf 2410 to the cabinet tower 2414, preventing unintended removal therefrom.

The construction and arrangements of cabinet system, as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for controlling access to medical products securely stored in a customizable cabinet comprising:
   a customizable cabinet defined by a cabinet frame having a top, bottom, rear, first side and second side wall arranged to define a cabinet interior;
   one or more covers attached to at least one of the top, bottom, first side and second side wall of the cabinet frame, the one or more covers defining at least a portion of the front exterior surface of the cabinet;
   a mounting structure attached to the cabinet frame at a location within the cabinet interior;
   a housing defining an interior and exterior of a control system, the housing comprising a mounting element configured to engage the mounting structure to mount the housing within the cabinet interior of the customizable cabinet;
   a monitor defining at least a portion of a front exterior side of the housing;
   wherein in a first mounting position, the housing interior is supported within the cabinet interior and the front exterior side of the housing extends along a first plane that is generally coplanar with the plane along which the one or more covers defining the front exterior of the cabinet extend; and
   wherein in a second mounting position, the housing is supported by the cabinet frame such that at least a portion of the housing interior extends outwards relative to the front exterior of the cabinet and the front exterior side of the housing extends along a second plane that is displaced relative to the plane along which the one or more covers defining the front exterior of the cabinet extend;
   a printer portion having a body portion defined at a first end by an output panel having a first output slot, the printer portion supported by the housing and slidable relative to the housing from a first location in which the printer body portion extends within the interior of the housing and the output panel defines a portion of the front exterior side of the housing to a second location in which the printer body portion and output panel extend outwards relative to the front exterior side of the housing;
   a keyboard supported by and slidable relative to the housing between the interior and exterior of the housing; and
   a processor within the control system, the processor electrically coupled to the monitor and keyboard.

2. The control system of claim 1 wherein the printer portion comprises:
   a first printer behind the first output slot, the first printer electrically coupled to the processor;
   a first recessed portion;
   a first spool housed in the first recessed portion, the first spool configured to support materials for printing and to feed the materials to the first printer; and
   wherein the first printer is configured to print information on the materials and feed the materials having the printed information through the first output slot.

3. The control system of claim 2 wherein the printer portion further comprises:
   a second output slot;
   a second printer behind the second output slot, the second printer electrically coupled to the processor;
   a second recessed portion;
   a second spool housed in the second recessed portion, the second spool configured to support materials for printing and to feed the materials to the second printer; and
   wherein the second printer is configured to print information on the materials and feed the materials having the printed information through the second output slot.

4. The control system of claim 2 wherein the printer portion further comprises a tensioning member, the tensioning member configured to maintain tension of materials supported by the first spool.

5. The control system of claim 1 further comprising a handle coupled to the printer portion, the handle configured to pull the printer portion relative to the housing.

6. The control system of claim 5 wherein the handle is recessed grove on one side of the printer portion.

7. The control system of claim 1 further comprising a latch coupled to the housing and configured to secure the control system to the customizable cabinet such that access to the interior is limited to qualified personnel.

8. The control system of claim 7 wherein the latch has a pivot, the pivot configured to engage with a secure tool to rotate and lift the latch relative to a knob securing the control system to the customizable cabinet.

9. The control system of claim 8 wherein the printer portion includes an access port configured to allow the secure tool to engage the pivot when the printer portion is slid out relative to the housing.

10. The control system of claim 1 further comprising an identification card reader located proximate a slot configured to receive user credentials.

11. The control system of claim 1 wherein the printer portion includes a locking mechanism configured to secure the printer portion to the housing.

12. The control system of claim 2 wherein the printer portion further comprises indicator lights configured to provide status information about the first printer.

13. The control system of claim 1 wherein the monitor is configured to be removable from the housing.

14. A control system for controlling access to medical products securely stored in a customizable cabinet comprising:
   a frame having a first plurality of slide rails, the first plurality of slide rails configured to be mountable within the structure of the customizable cabinet such that, when the frame is in a first position, a front exterior surface of the frame defines a portion of a front exterior surface of the customizable cabinet;
   a monitor coupled to the frame, the monitor defining a portion of the front exterior surface of the frame;
   a printer portion comprising:
      a second plurality of slide rails, the second plurality of slide rails configured to be mounted to the frame;
      a first output slot extending through an output surface; and
      a printer located behind the first output slot;
      wherein when the printer portion is in a first position, the output surface defines a portion of the front exterior surface of the frame;
   a keyboard tray configured to support a keyboard, the keyboard tray being supported by and slidable relative to the frame and defining a portion of the front exterior surface of the frame when the keyboard tray is in a first position; and
   a processor supported by the frame, the processor electrically coupled to the monitor, the first printer, and the keyboard;
   wherein the movement of any of the frame relative to the cabinet, the movement of the second plurality of slide rails relative to the frame, and the movement of the keyboard tray relative to the frame may occur independent of the movement of any of the other of the frame relative to the cabinet, the movement of the second plurality of slide rails relative to the frame, and the movement of the keyboard tray relative to the frame.

15. The control system of claim 14 wherein the printer portion further comprises:
   a first recessed portion;
   a first spool housed in the first recessed portion, the first spool configured to support materials for printing and to feed the materials to the first printer; and
   wherein the first printer is configured to print information on the materials and feed the materials having the printed information through the first output slot.

16. The control system of claim 15 wherein the printer portion further comprises:
   a second output slot;
   a second printer behind the second output slot, the second printer electrically coupled to the processor;
   a second recessed portion;
   a second spool housed in the second recessed portion, the second spool configured to support materials for printing and to feed the materials to the second printer; and
   wherein the second printer is configured to print information on the materials and feed the materials having the printed information through the second output slot.

17. The control system of claim 14 further comprising a latch coupled to the frame and configured to secure the control system to the customizable cabinet such that access to the interior is limited to qualified personnel.

18. The control system of claim 17 wherein the latch has a pivot, the pivot configured to engage with a secure tool to rotate and lift the latch relative to a knob securing the control system to the customizable cabinet.

19. The control system of claim 18 wherein the printer portion further comprises an access port configured to allow the secure tool to engage the pivot when the printer portion is slid out relative to the frame.

20. A control system for controlling access to medical products comprising:
   a medical cabinet having a support structure and at least one storage location for securing medical products, the storage location including an electric lock operable between a locked and unlocked state, wherein the medical products are inaccessible when the electric lock is in the lock state and accessible when the electric lock is in the unlocked state;
   a plurality of support rails attached along an interior surface of the support structure;
   a frame having a first plurality of slide rails, the first plurality of slide rails configured to engage the plurality of support rails to slidably mount the frame relative to the support structure;
   a monitor coupled to the frame such that the monitor moves when the frame is moved relative to the support structure;
   a keyboard supported by and slidable relative to the frame; and
   a processor supported by the frame, the processor electrically coupled to the monitor, the keyboard, and the electric lock and configured to switch the state of the electric lock from locked to unlocked in response to a control command entered on the keyboard.

* * * * *